US011558853B2

(12) United States Patent
Ly et al.

(10) Patent No.: US 11,558,853 B2
(45) Date of Patent: Jan. 17, 2023

(54) PHYSICAL UPLINK SHARED CHANNEL OCCASION AGGREGATION

(71) Applicant: QUALCOMM Incorporated, San Diego, CA (US)

(72) Inventors: Hung Dinh Ly, San Diego, CA (US); Jing Lei, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 16/834,759

(22) Filed: Mar. 30, 2020

(65) Prior Publication Data

US 2020/0322926 A1 Oct. 8, 2020

Related U.S. Application Data

(60) Provisional application No. 62/829,965, filed on Apr. 5, 2019.

(51) Int. Cl.
*H04W 72/04* (2009.01)
*H04W 74/08* (2009.01)

(52) U.S. Cl.
CPC ....... *H04W 72/04* (2013.01); *H04W 74/0833* (2013.01)

(58) Field of Classification Search
CPC ........... H04W 72/121; H04W 72/1257; H04W 74/0833; H04W 72/0413
See application file for complete search history.

(56) References Cited

U.S. PATENT DOCUMENTS

| 2013/0083753 A1* | 4/2013 | Lee ........................ H04L 1/1858 370/329 |
| 2015/0257150 A1* | 9/2015 | Yi ......................... H04L 5/0016 370/329 |

(Continued)

OTHER PUBLICATIONS

Huawei, et al., "Further Discussion on Channel Structure for 2-Step RACH," 3GPP Draft, 3GPP TSG RAN WG1 Meeting #96bis, R1-1903923, 3RD Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019- Apr. 12, 2019, Mar. 29, 2019 (Mar. 29, 2019), XP051691165, 6 pages, Retrieved from the Internet: URL: http://www.3gpp.org/ftp/tsg%5Fran/WG1%5FRL1/TSGR1%5F96b/Docs/R1%2D1903923%2Ezip [retrieved on Mar. 29, 2019] Section 2, sub-section 2.1.

(Continued)

*Primary Examiner* — Raj Jain
(74) *Attorney, Agent, or Firm* — Holland & Hart LLP

(57) ABSTRACT

This disclosure describes methods, devices, and systems for techniques related to random access procedures, such as a two-step random access procedure. Generally, the described techniques support physical uplink shared channel (PUSCH) occasion (PO) aggregation in random access procedures, including aggregation configurations and communication schemes that support enhanced data transmissions, such as small data transmissions, in random access procedures. In some examples, the described techniques may include aggregating POs in a time domain, or a frequency domain, or both. A device, such as a user equipment (UE) may aggregate, in one or more of a time domain or a frequency domain, multiple POs of a set of POs, and transmit, to a device such as a base station, a random access payload of a random access message on a PUSCH using time and frequency resources of the aggregated multiple POs.

30 Claims, 20 Drawing Sheets

(56) References Cited

U.S. PATENT DOCUMENTS

| | | | |
|---|---|---|---|
| 2018/0109976 A1* | 4/2018 | Ly | H04W 28/04 |
| 2018/0205516 A1* | 7/2018 | Jung | H04W 74/0833 |
| 2018/0220468 A1* | 8/2018 | Lin | H04W 74/008 |
| 2019/0364599 A1* | 11/2019 | Islam | H04W 74/004 |
| 2020/0100297 A1 | 3/2020 | Agiwal et al. | |
| 2020/0322926 A1* | 10/2020 | Ly | H04W 74/0833 |
| 2022/0007426 A1* | 1/2022 | Shi | H04W 74/0841 |

OTHER PUBLICATIONS

International Search Report and Written Opinion—PCT/US2020/026015—ISA/EPO—dated Jun. 15, 2020.

Nokia, et al., "On 2-Step RACH Channel Structure," 3GPP Draft, 3GPP TSG RAN WG1 #96bis, R1-1904715, on 2-Step RACH Channel Structure, 3RD Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Mar. 29, 2019 (Mar. 29, 2019), XP051691708, 13 pages, Retrieved from the Internet: URL: http://www.3gpp.org/ftp/tsg%5Fran/WG1%5FRL1/TSGR1%5F96b/Docs/R1%2D1904715%2Ezip [retrieved on Mar. 29, 2019] Section 2.2, sub-section 2.2.1.

Vivo: "Discussion on Channel Structure for 2-step RACH," 3GPP Draft, 3GPP TSG RAN WG1 #96bis, R1-1904059_Discussion on Channel Structure for 2-STEP RACH, 3RD Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Mar. 30, 2019 (Mar. 30, 2019), XP051691264, 10 pages, Retrieved from the Internet: URL: http://www.3gpp.org/ftp/tsg%5Fran/WG1%5FRL1/TSGR1%5F96b/Docs/R1%2D1904059%2Ezip [retrieved on Mar. 30, 2019] Sections 2.1, 2.4. 2.7.

* cited by examiner

PHYSICAL UPLINK SHARED CHANNEL OCCASION AGGREGATION

CROSS REFERENCE

The present Application for Patent claims the benefit of U.S. Provisional Patent Application No. 62/829,965 by L Y et al., entitled "PHYSICAL UPLINK SHARED CHANNEL OCCASION AGGREGATION," filed Apr. 5, 2019, assigned to the assignee hereof, and expressly incorporated by reference in its entirety herein.

TECHNICAL FIELD

The following relates generally to wireless communications, and more specifically to physical uplink shared channel occasion (PO) aggregation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may include a number of base stations or network access nodes, each simultaneously supporting communication for multiple communication devices, which may be otherwise known as user equipments (UEs). Some wireless communications systems may support one or more random access procedures, such as a two-step random access procedure for communication between a UE and a base station. The random access procedures may involve a series of messages exchanged between the UE and the base station. As demand for communication efficiency increases, it may be desirable for a wireless communications system to target low latencies for random access procedures. Additionally, wireless communication devices may seek increased reliability for random access messaging. In some examples, however, some random access procedures may fail to provide signaling capacity and robustness for enhanced random access messaging, including support for data transmissions.

SUMMARY

The described techniques relate to methods, systems, devices, and apparatuses that support techniques related to random access procedures, such as a two-step random access procedure. Generally, the described techniques support physical uplink shared channel occasion (PO) aggregation in random access procedures, including aggregation configurations and communication schemes that support enhanced small data transmissions and spectral efficiency for random access procedures. In some examples, the described techniques may include aggregating POs in a time domain for random access procedures. In some examples, the described techniques may include aggregating POs in a frequency domain in random access procedures. In some examples, the described techniques may include aggregating POs in both a time domain and a frequency domain in random access procedures, such as two-step random access procedures.

Additionally, the described techniques may include aggregating POs in random access procedures based on signaling including an indication, such as a bitmap or an indication of a number of POs to be aggregated, among other examples. Additionally or alternatively, the described techniques may include aggregating POs in random access procedures according to one or more of a slot format, a duplex mode, a physical uplink shared channel (PUSCH) link budget, a location of the UE within a cell, or a PUSCH peak to average power ratio (PAPR). For example, the sizes of the POs may be kept the same and multiple POs may be aggregated for PUSCH transmission. In some examples, the small data transmissions may be carried by a random access payload of a random access message. In some examples, small data transmission may be communicated in the aggregated POs along with random access messages. The described techniques may include features for enabling increased spectral efficiency, increased data rates, and, in some examples, promoting low latency associated with random access messaging as well as data communications, among other benefits.

A method of wireless communications at a UE is described. The method may include receiving, from a base station, signaling including an indication of an aggregation configuration for POs, determining a random access message of a random access procedure, the random access message including a random access preamble and a random access payload, aggregating, in one or more of a time domain or a frequency domain, multiple POs of a set of POs based at least in part on the aggregation configuration, and transmitting, to the base station, the random access payload of the random access message on a PUSCH that includes the aggregated multiple POs, each of the POs including time and frequency resources.

An apparatus for wireless communications is described. The apparatus may include a processor, memory in electronic communication with the processor, and instructions stored in the memory. The instructions may be executable by the processor to cause the apparatus to receive, from a base station, signaling including an indication of an aggregation configuration for POs, determine a random access message of a random access procedure, the random access message including a random access preamble and a random access payload, aggregate, in one or more of a time domain or a frequency domain, multiple POs of a set of POs based at least in part on the aggregation configuration, and transmit, to the base station, the random access payload of the random access message on a PUSCH that includes the aggregated multiple POs, each of the POs including time and frequency resources.

Another apparatus for wireless communications is described. The apparatus may include means for receiving, from a base station, signaling including an indication of an aggregation configuration for POs, means for determining a random access message of a random access procedure, the random access message including a random access preamble and a random access payload, means for aggregating, in one or more of a time domain or a frequency domain, multiple POs of a set of POs based at least in part on the aggregation configuration, and means for transmitting, to the base station, the random access payload of the random access message on a PUSCH that includes the aggregated multiple POs, each of the POs including time and frequency resources.

A non-transitory computer-readable medium storing code for wireless communications at a UE is described. The code may include instructions executable by a processor to receive, from a base station, signaling including an indication of an aggregation configuration for POs, determine a random access message of a random access procedure, the random access message including a random access preamble and a random access payload, aggregate, in one or more of a time domain or a frequency domain, multiple POs of a set of POs based at least in part on the aggregation configuration, and transmit, to the base station, the random access payload of the random access message on a PUSCH that includes the aggregated multiple POs, each of the POs including time and frequency resources.

A method of wireless communications at a base station is described. The method may include assigning a set of POs for transmission of a random access payload of a random access message associated with a random access procedure, determining, in one or more of a time domain or a frequency domain, an aggregation configuration for multiple POs of the set of POs based at least in part on the assigning, and transmitting, to a UE, signaling including an indication of the aggregation configuration for POs.

An apparatus for wireless communications is described. The apparatus may include a processor, memory in electronic communication with the processor, and instructions stored in the memory. The instructions may be executable by the processor to cause the apparatus to assign a set of POs for transmission of a random access payload of a random access message associated with a random access procedure, determine, in one or more of a time domain or a frequency domain, an aggregation configuration for multiple POs of the set of POs based at least in part on the assigning, and transmit, to a UE, signaling including an indication of the aggregation configuration for POs.

Another apparatus for wireless communications is described. The apparatus may include means for assigning a set of POs for transmission of a random access payload of a random access message associated with a random access procedure, means for determining, in one or more of a time domain or a frequency domain, an aggregation configuration for multiple POs of the set of POs based at least in part on the assigning, and means for transmitting, to a UE, signaling including an indication of the aggregation configuration for POs.

A non-transitory computer-readable medium storing code for wireless communications at a base station is described. The code may include instructions executable by a processor to assign a set of POs for transmission of a random access payload of a random access message associated with a random access procedure, determine, in one or more of a time domain or a frequency domain, an aggregation configuration for multiple POs of the set of POs based at least in part on the assigning, and transmit, to a UE, signaling including an indication of the aggregation configuration for POs.

DETAILED DESCRIPTION

Figure 1:
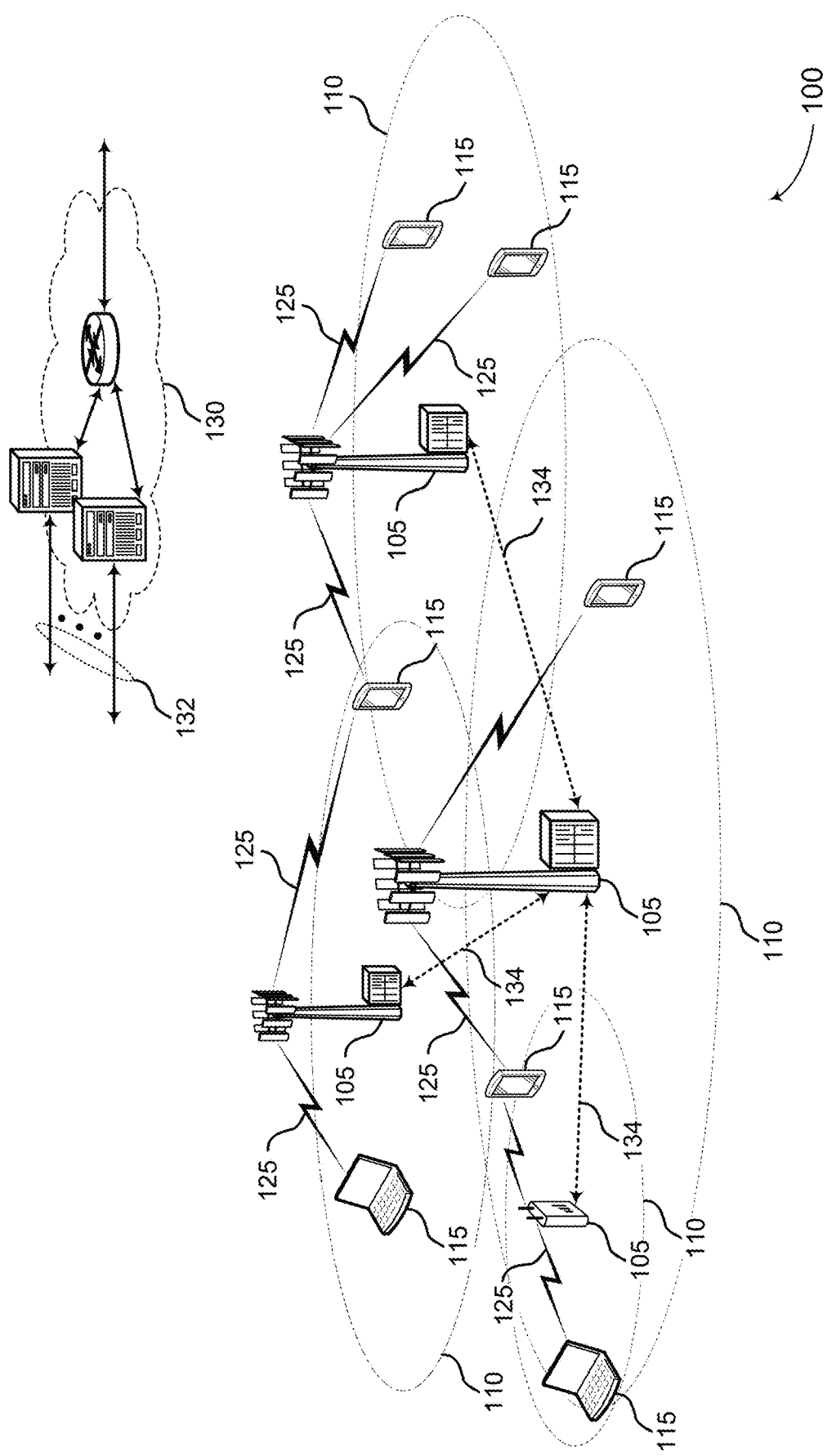
FIGS. 1 and 2 illustrate examples of a wireless communications system that supports techniques related to physical uplink shared channel occasion (PO) aggregation in accordance with aspects of the present disclosure.

Some wireless communication systems may have user equipments (UEs) and base stations, for example, next-generation NodeBs or giga-NodeBs (either of which may be referred to as a gNB) that support one or more random access procedures for communication, including an initial access to a channel, a connection re-establishment, a handover procedure, or synchronization on the channel, among others. The random access procedure may include a series of handshake messages, such as random access messages carrying information that may facilitate the communication between the UE and the base station. In some examples, a random access procedure may be or may include a two-step random access procedure, which may reduce latency compared to other random access procedures that use a greater number of handshake messages, such as a four-step random access procedure. As demand for low latency communication increases, the wireless communications system may target low latencies or may seek resource reliability for random access signaling, particularly for small data communications. Small data communications may be user plane data transmissions that may have a payload less than a regular scheduled transmission. In some examples, small data communications may include small amounts of data with minimal network impact, for example, signaling overhead, network resources, or delay for reallocation, among other examples.

As part of one or more typical random access procedures, the UEs may transition between radio resource control (RRC) states. For example, in a typical random access procedure, the UEs may switch from an RRC idle state or an RRC inactive state to an RRC connected state to complete the random access procedure and enable data transmissions. However, in examples of a two-step random access procedure, UEs may be capable of small data transmissions without having to switch to the RRC connected state. As a result, the UEs may achieve low power consumption by allowing the UEs to remain in the RRC inactive state without transitioning to the RRC connected state for data transmission. The small data transmissions may be carried by a random access payload of a random access message, such as a message A (msgA) of a two-step random access procedure. Generally, a random access payload of msgA may support carrying a relatively small amount of data, for example, 56 bits or 76 bits of data. In some examples, however, a payload size may vary and exceed a size of the random access payload of msgA.

As described herein, UEs and base stations may support physical uplink shared channel occasion (PO) aggregation in random access procedures. Various aspects particularly relate to aggregation configurations and communication schemes that support enhanced small data transmissions and spectral efficiency. For example, the described techniques may address challenges with variable size payloads for small data transmissions. In some aspects, a UE may receive signaling including an indication of an aggregation configuration for POs. The UE may aggregate, in one or more of a time domain or a frequency domain, multiple POs of a set of POs according to the aggregation configuration. In some examples, the described techniques may include aggregating the POs in two-step random access procedures according to one or more of a slot format, a duplex mode, a physical uplink shared channel (PUSCH) link budget, a UE location within a cell, or a PUSCH peak to average power ratio (PAPR). In some examples, the UE location (for example, whether the UE is closer or farther from a cell center or a cell edge) may be a condition of the UE and may be determined based on a physical random access channel (PRACH) received at the base station, among other methods. The UE may transmit, on a PUSCH as one example, a random access payload of a random access message, such as msgA of a two-step random access procedure, carrying a relatively small amount of data on time and frequency resources of the aggregated multiple POs.

Particular aspects of the subject matter described in this disclosure may be implemented to realize one or more of the following potential advantages. Supported aggregation configurations for a two-step random access procedure may include features for increasing a number of small data transmissions. The described techniques may support increased spectral efficiency and, in some examples, may promote low latency communication associated with random access messaging, among other benefits. For example, the described aggregation configurations associated with a two-step random access procedure may support transmitting one or more small random access payloads while in an idle or inactive state resulting in power saving operations.

Aspects of the disclosure are initially described in the context of a wireless communications system. Aspects of the disclosure are further described in the context one or more additional wireless communications systems and one or more aggregation schemes that relate to aspects for PO aggregation. Aspects of the disclosure are further illustrated by and described with reference to apparatus diagrams, system diagrams, and flowcharts that relate to several aspects related to PO aggregation.

FIG. 1 illustrates an example of a wireless communications system 100 that supports techniques related to PO aggregation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (such as mission critical) communications, low latency communications, or communications with low-cost and low-complexity devices.

Base stations 105 may wirelessly communicate with UEs 115 via one or more base station antennas. Base stations 105 described herein may include or may be referred to by persons having ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as macro or small cell base stations). The UEs 115 described herein may be able to communicate with various types of base stations 105 and network equipment including macro eNBs, small cell eNBs, gNBs, relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as over a carrier), and may be associated with an identifier for distinguishing neighboring cells (such as a physical cell identifier (PCID), a virtual cell identifier (VCID)) operating via the same or a different carrier. In some examples, a carrier may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (such as a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, or meters, among other examples.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode if not engaging in active communications, or operating over a limited bandwidth (such as according to narrowband communications). In some examples, UEs 115 may be designed to support critical functions (such as mission critical functions), and a wireless communications system 100 may be configured to provide ultra-reliable communications for these functions.

In some examples, a UE 115 may also be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In some examples, D2D communications are carried out between UEs 115 without the involvement of a base station 105.

Base stations 105 may communicate with the core network 130 and with one another. For example, base stations 105 may interface with the core network 130 through backhaul links 132 (such as via an S1, N2, N3, or other interface). Base stations 105 may communicate with one another over backhaul links 134 (such as via an X2, Xn, or other interface) either directly (such as directly between base stations 105) or indirectly (such as via core network 130).

The core network 130 may provide user authentication, access authorization, tracking, Internet Protocol (IP) connectivity, and other access, routing, or mobility functions. The core network 130 may be an evolved packet core (EPC), which may include one or more mobility management entities (MMEs), one or more serving gateways (S-GWs), and one or more Packet Data Network (PDN) gateways (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (such as from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. If operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as a base station 105) and a receiving device (such as a UE 115), in which the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

Beamforming, which may also be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (such as with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as by the base station 105 or a receiving device, such as a UE 115) a beam direction for subsequent transmission or reception, or both by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at antenna elements of an antenna array, or by processing received signals according to different receive beamforming weight sets applied to signals received at antenna elements of an antenna array, any of which may be referred to as "listening" according to different receive beams or receive directions. In some examples, a receiving device may use a single receive beam to receive along a single beam direction (such as if receiving a data signal). The single receive beam may be aligned in a beam direction determined based at least in part on listening according to different receive beam directions (such as a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some examples, a wireless device may support same-slot HARQ feedback, in which the device may provide HARQ feedback in a specific slot for data received in a previous symbol in the slot. In some examples, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), in which the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In some examples, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as in an FDD mode), or be configured to carry downlink and uplink communications (such as in a TDD mode). In some examples, signal waveforms transmitted over a carrier may be made up of multiple sub-carriers (such as using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (such as synchronization signals or system information) and control signaling that coordinates operation for the carrier. In some examples (such as in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (such as between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 MHz). In some examples, each served UE 115 may be configured for operating over portions or all of the carrier bandwidth. In some examples, some UEs 115 may be configured for operation using a narrowband protocol type that is associated with a predefined portion or range (such as set of subcarriers or RBs) within a carrier (such as "in-band" deployment of a narrowband protocol type).

In a system employing MCM techniques, a resource element may consist of one symbol period (such as a duration of one modulation symbol) and one subcarrier, in which the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 or both that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (such as if multiple serving cells have a suboptimal or non-ideal backhaul link). An eCC may also be configured for use in unlicensed spectrum or shared spectrum (such as in which more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as according to frequency channel or carrier bandwidths of 20, 40, 60, or 80 MHz or higher) at reduced symbol durations (such as 16.67 microseconds or shorter). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (such as across the frequency domain) and horizontal (such as across the time domain) sharing of resources.

A base station 105 may perform a connection procedure, such as a cell acquisition procedure, or a random access procedure, among other examples, with a UE 115. For example, a base station 105 and a UE 115 may perform a random access procedure to establish a connection. In various examples, a base station 105 and a UE 115 may perform a random access procedure to re-establish a connection after connection failure (such as radio-link failure) with the base station 105, or to establish a connection for handover to another base station, among other examples. In some examples, the random access procedure may be a four-step random access procedure. As part of the four-step random access procedure, a UE 115 may transmit a random access message (message 1 (msg1)) carrying a random access preamble. The random access preamble may enable a base station 105 to distinguish between multiple UEs 115 attempting to access the wireless communications system 100 simultaneously.

The base station 105 may respond with a random access response (message 2 (msg2) that provides an uplink resource grant, a timing advance, and a temporary cell-radio network temporary identifier (C-RNTI). The UE 115 may transmit a subsequent random access message (message 3 (msg3)) that includes an RRC connection request along with a temporary mobile subscriber identity (TMSI) (if the UE 115 has previously been connected to the same wireless network) or a random identifier. The RRC connection request also may indicate the reason the UE 115 is connecting to the network, for example, such as one or more of emergency, signaling, or data exchange. The base station 105 may respond to the connection request with a contention resolution message (message 4 (msg4)) addressed to the UE 115, which may provide a new C-RNTI. If the UE 115 receives a contention resolution message with the correct identification, it may proceed with RRC connection setup. If the UE 115 does not, however, receive a contention resolution message (for example, if there is a conflict with another UE 115) it may repeat the random access process by transmitting a new random access preamble. As described, the exchange of messages between the UE 115 and the base station 105 for random access may be referred to as a four-step random access procedure.

In some examples, a two-step random access procedure may be performed for random access. A UE 115 that operates in licensed or unlicensed spectrum within the wireless communications system 100 may participate in a two-step random access procedure to reduce delay in establishing communication with a base station 105 (such as compared to a four-step random access procedure). In some examples, the two-step random access procedure may operate regardless of whether a UE 115 has a valid timing advance parameter. For example, a UE 115 may use a valid timing advance parameter to coordinate the timing of its transmissions to a base station 105 (to account for propagation delay) and may receive the valid timing advance parameter as part of the two-step random access procedure. Additionally, the two-step random access procedure may be applicable to any cell size, may work regardless of whether the random access procedure is contention-based or contention-free, and may combine multiple random access messages from a four-step random access procedure.

For example, a UE 115 may transmit a first random access message (for example, message A (msgA)) to a base station 105. The first random access message may include, for example, the contents of a msg1 and a msg3 from a four-step random access procedure. The msgA may include or consist of a random access preamble and a PUSCH carrying a random access payload with the contents of the message (for example, the content of a msg3 in a four-step random access procedure). The UE 115 may transmit the random access preamble on a physical random access channel (PRACH). In some examples, the PUSCH may also carry a reference signal, such as a PUSCH demodulation reference signal (DMRS). In some examples, in response to receiving the msgA, the base station 105 may transmit a downlink control channel (such as a physical downlink control channel (PDCCH) or physical downlink shared channel (PDSCH)) carrying a corresponding second random access message (for example, message B (msgB)) to the UE 115. The second message may include, for example, the contents of a msg2 and a msg4 from a four-step random access procedure.

In an example of multibeam implementation of a two-step random access procedure, transmission of a random access preamble on a physical random access channel and transmission of a PUSCH carrying a random access payload may occur over one or more occasions. For example, transmission of a random access preamble on a PRACH may occur over one or more random access channel occasions (RO). In some examples, transmission of a PUSCH carrying a random access payload may occur over a PO.

In some implementations, there may be a relationship between one or more occasions. In some examples, ROs and POs may have a one-to-one mapping. For example, a single RO may map to a single respective PO. In various examples, ROs and POs may have one to many mappings. For example, a single RO may map to several POs. Alternatively, multiple ROs may map to a single PO using a many to one mapping. The UE 115 may multiplex a transmission of a random access preamble over time and frequency resources of multiple ROs. The UE 115 may, in some examples, similarly multiplex a transmission of a PUSCH carrying a random access payload over time and frequency resources of multiple POs yielding one or more advantages.

As part of one or more random access procedures, UEs 115 may transition between RRC states. For example, a UE 115 may switch from an RRC idle state or an RRC inactive state to an RRC connected state. In the example of a two-step random access procedure, a UE 115 may be capable of relatively small data transmissions without having to switch to the RRC connected state. The small data transmissions may be carried by a random access payload of a random access message, such as msgA of the two-step random access procedure. Generally, a random access payload of msgA may support carrying a relatively small amount of data, for example, 56 bits or 76 bits of data. For a random access preamble, a PRACH payload (for example, msgA preamble) may be a fixed size and therefore corresponding ROs may also have a fixed size. In some examples, however, for a random access payload (for example, msgA payload) the size may vary and exceed a size of a PUSCH payload in a two-step random access procedures for small data transmissions. Hence, the PO size may be variable to meet different PUSCH link budgets (for example, because a PO is a time-frequency resource for transmitting a PUSCH that carries a payload of msgA and because the payload may have a variable size the PO may have a variable size to accommodate the variable size of the msgA payload). In some examples, however, multiplexing multiple POs with different sizes may be complex and therefore multiplexing multiple POs with variable sizes may be disadvantageous to UEs 115 due to increased undesirable resource consumption, for example power consumption, as well as in terms of increased undesirable latency for some random access procedures.

As described herein, the UEs 115 and the base stations 105 may support PO aggregation in two-step random access procedures, in which the sizes of the POs may be the same and multiple POs may be aggregated for PUSCH transmission, which can, among other benefits, reduce undesirable resource consumption, for example power consumption, and reduce undesirable latency for some random access procedures. As a result, the UEs 115 and the base stations 105 may be enabled to multiplex the multiple POs of the same size and conserve resources which may otherwise be used for other operations. Generally, as described herein, the UEs 115 and the base stations 105 may support PO aggregation in two-step random access procedures, including support for aggregation configurations and communication schemes. Such configurations and schemes may support small data transmissions and spectral efficiency, for example, to address challenges with variable size payloads for small data transmissions.

For example, a UE 115 may receive signaling including an indication of an aggregation configuration for POs. The UE 115 may aggregate, in one or more of a time domain or a frequency domain (such as in a time domain, in a frequency domain, or in both a time domain and a frequency domain), multiple POs of a set of POs according to the aggregation configuration. In some aspects, the described techniques may include aggregating POs in two-step random access procedures according to one or more of a slot format, a duplex mode, a PUSCH link budget, a UE location within a cell, or a PUSCH PAPR. In some examples, the UE 115 location may be described as or referred to as a condition of the UE 115. That is, one condition of the UE 115 may be based on a location of the UE 115 relative to one or more points. For example, the condition of the UE 115 may be related to or based on the location of the UE 115 relative to a cell, such as whether the UE 115 is closer to a cell center or closer to a cell edge. In some examples, this condition of the UE 115 based on the location of the UE 115 may be determined based on one or more communications received over a PRACH at the base station 105. The UE 115 may transmit a random access payload of a random access message, such as msgA of a two-step random access procedure, carrying a relatively small amount of data (for example, msgA payloads of 56 bits, or 76 bits, among other examples) on a PUSCH using time and frequency resources of the aggregated multiple POs thereby reducing or eliminating latencies associated with processes related to small data transmissions. The small data transmissions may include small amounts of data with minimal network impact, for example, with minimal signaling overhead, network resources, or delay for reallocation. For example, the UE 115 may transmit the msgA payload while in an RRC idle state or an RRC inactive state.

The described techniques may provide efficacy to the UEs 115 by reducing or eliminating latencies associated with processes related to small data transmissions and random access procedures. More specifically, the described aggregation configurations associated with two-step random access procedures may support increased spectral efficiency, as well as, transmitting one or more small random access payloads while in an idle or inactive state resulting in power saving operations for random access, among other advantages. Supported aggregation configurations for two-step random access procedures may include features for increasing a number of small data transmissions over multiple POs.

Figure 2:
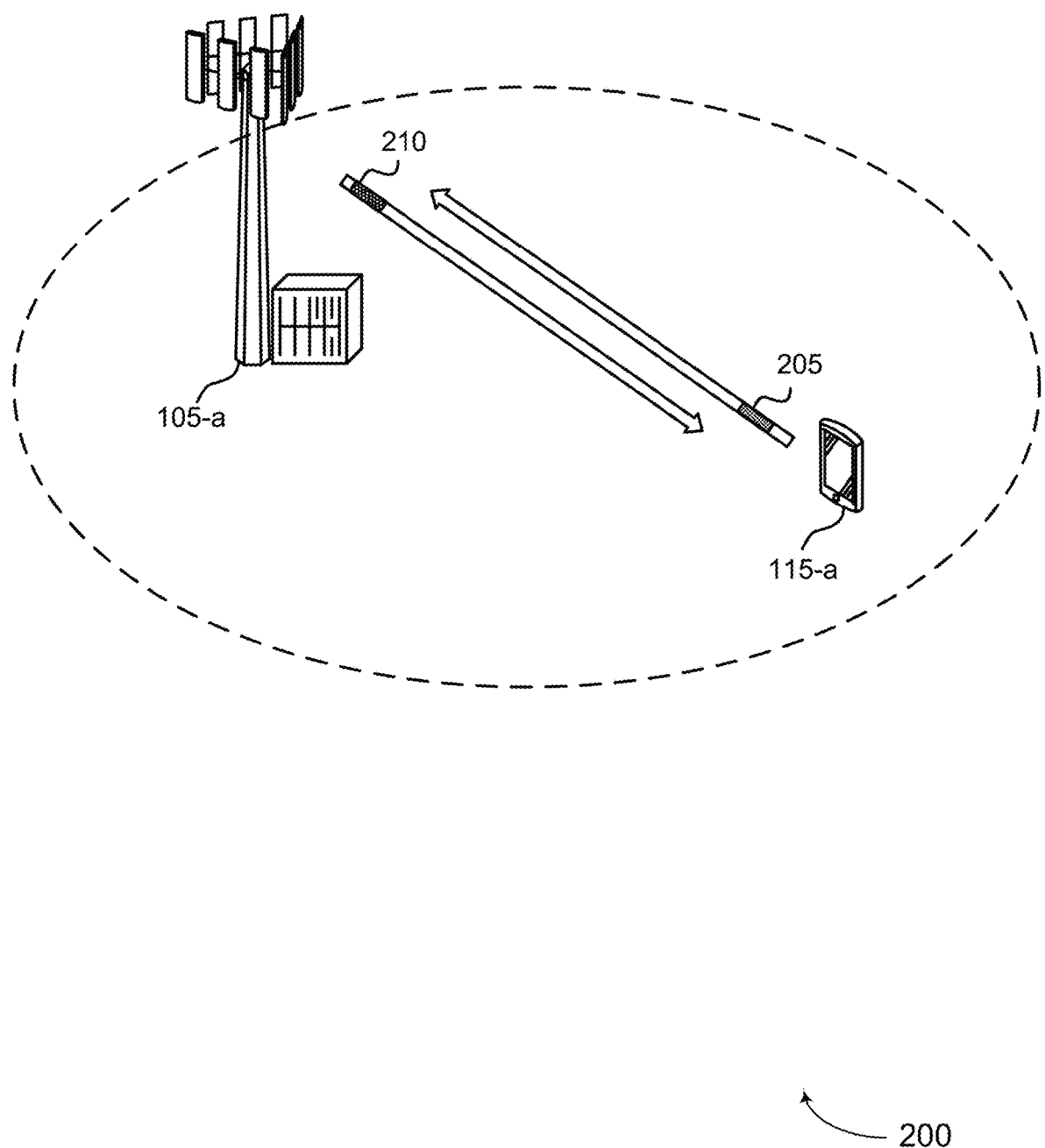

FIG. 2 illustrates an example of a wireless communications system 200 that supports techniques related to PO aggregation in accordance with aspects of the present disclosure. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may include a base station 105-a and a UE 115-a, which may be examples of the corresponding devices described with reference to FIG. 1. For example, the base station 105-a and the UE 115-a may support PO aggregation in random access procedures, in which sizes of POs may be retained the same and multiple POs may be aggregated for PUSCH transmission. The random access procedures may correspond to, for example, one or more of the example radio access technologies described herein.

By way of example, the wireless communications system 200 may be related to 5G systems and the random access procedure may correspond to a two-step random access procedure. As part of a two-step random access procedure, the base station 105-a and the UE 115-a may exchange fewer random access messages compared to a four-step random access procedure related to 4G systems. For example, the UE 115-a may transmit a random access message 205 (also referred to herein as msgA) that may include a random access preamble carried on a PRACH and a random access payload carried on a PUSCH. In response to the random access message 205, the base station 105-a may transmit a random access response message 210 (also referred to herein as msgB) on a downlink channel, for example, a physical downlink control channel (PDCCH) or a physical downlink shared channel (PDSCH). The random access message 205 may combine parts of msgs1, 3 of a four-step random access procedure, while the random access response message 210 may combine aspects of msgs2, 4 of the four-step random access procedure.

An advantage of the two-step random access procedure compared to a four-step random access procedure is that the UE 115-a may be capable of transmitting data to the base station 105-a without having to be in an RRC connected state for one data transmission. As described herein, the base station 105-a and the UE 115-a may support PO aggregation in random access procedures, in which the sizes of POs may be maintained the same but multiple POs may be aggregated for PUSCH transmission. To support PO aggregation in random access procedures, such as two-step random access procedures, the base station 105-a may allocate one or more ROs and multiple POs for transmission of the random access message 205. For example, the base station 105-a may assign a set of POs for transmission of a random access payload of the random access message 205. Each PO may span multiple symbol periods and include multiple subcarrier frequencies for a physical channel, for example, such as a PUSCH. In some examples, all POs may be the same size. For example, all POs may have a same resource block size including a same number of uplink symbol periods and a same number of subcarriers frequencies. In some examples, the PO size may have a default payload size. For example, the size of each of the individual POs may be a default size of the random access payload of the random access message 205, such as 72 bits. In some examples, for relatively larger random access payloads of a random access message 205, for example, exceeding 72 bits, multiple POs may be aggregated to allow more resources for PUSCH transmission.

The base station 105-a may determine an aggregation configuration for multiple POs of the set of POs according to one or more factors. In some examples, the base station 105-a may identify a slot format and may determine an aggregation configuration based on the slot format. A slot may span a number of symbol periods. In the example of NR systems, a slot may span 14 symbol periods. In some examples, a slot format may provide an indication of which symbol periods in a slot are allocated for uplink transmissions or downlink transmissions. As such, the base station 105-a may determine a number of POs to be aggregated to carry a random access payload of the random access message 205 over a slot according to the number of contiguous or noncontiguous symbols allocated for uplink transmission in the slot. The number of POs to be aggregated may be signaled in the aggregation configuration or may be provided in a bitmap to the UE 115-a, as described herein.

In various examples, the base station 105-a may determine a duplex mode, for example, such as an FDD mode or a TDD mode, and may determine an aggregation configuration based on the duplex mode. In FDD, uplink transmissions from the UE 115-a and downlink transmissions from the base station 105-a may use different frequencies, for example, sub-carriers while using a same slot. In TDD, uplink transmissions from the UE 115-a and downlink transmissions from the base station 105-a may occur over different slots, while operating in a same frequency. According to the duplex mode, the base station 105-a may determine the POs aggregation configuration in a time domain, or a frequency domain, or both.

In some examples, the base station 105-a may determine a PUSCH link budget and determine an aggregation configuration based on the PUSCH link budget. A link budget may provide an estimate of a number of resources for the base station 105-a and the UE 115-a to achieve a specific coverage and capacity performance. For example, a PUSCH link budget may include a channel bandwidth, a total number of resource blocks, allocated resource blocks, or allocated subcarriers, among other examples. Additionally or alternatively, the base station 105-a may determine a PUSCH PAPR and determine an aggregation configuration based on the PUSCH PAPR. As such, the base station 105-a may determine an aggregation configuration that satisfies the PUSCH link budget, as well as maintains a PUSCH PAPR threshold.

The base station 105-a may transmit signaling including an indication of the aggregation configuration for the POs to the UE 115-a via signaling, such as RRC signaling, or higher layer signaling, among other examples. In some examples, the base station 105-a may transmit a bitmap including one or more bits that correspond to the multiple POs. For example, the base station 105-a may generate the bitmap if determining the aggregation configuration for POs and may configure the UE 115-a with the bitmap. Additionally or alternatively, the base station 105-a may transmit an indication of a quantity of POs for the UE 115-a to aggregate for transmitting a random access payload of the random access message 205 and one or more criteria (for example, rules) for the UE 115-a to select the multiple POs in a set of POs.

The UE 115-a may receive, from the base station 105-a, signaling including the indication of the aggregation configuration for POs. In some examples, the UE 115-a may receive the bitmap including one or more bits that correspond to the multiple POs. In various examples, the UE 115-a may receive an indication of the quantity of POs to aggregate for transmitting the random access payload of the random access message 205. The UE 115-a may select the quantity of POs within the set of POs based on one or more criteria, and may aggregate the selected quantity of POs. As described herein, the UE 115-a may select the quantity of POs, for example, according to one or more of a slot format, a duplex mode, a PUSCH link budget, a UE location within a cell, or a PUSCH PAPR, among other examples. In some examples, the UE 115-a location may be described as or referred to as a condition of the UE 115-a. That is, one condition of the UE 115-a may be based on a location of the UE 115-a relative to one or more points. For example, the condition of the UE 115-a may be related to or based on the location of the UE 115-a relative to a cell, such as whether the UE 115-a is closer to a cell center or closer to a cell edge. In some examples, this condition of the UE 115-a based on the location of the UE 115-a may be determined based on one or more communications received over a PRACH at the base station 105-a In various examples, according to the indication of the aggregation configuration, the UE 115-a may aggregate, in one or more of a time domain or a frequency domain, multiple POs. Examples of aggregation configurations are described with reference to FIGS. 3-5, and are discussed in more detail herein.

Figure 3:
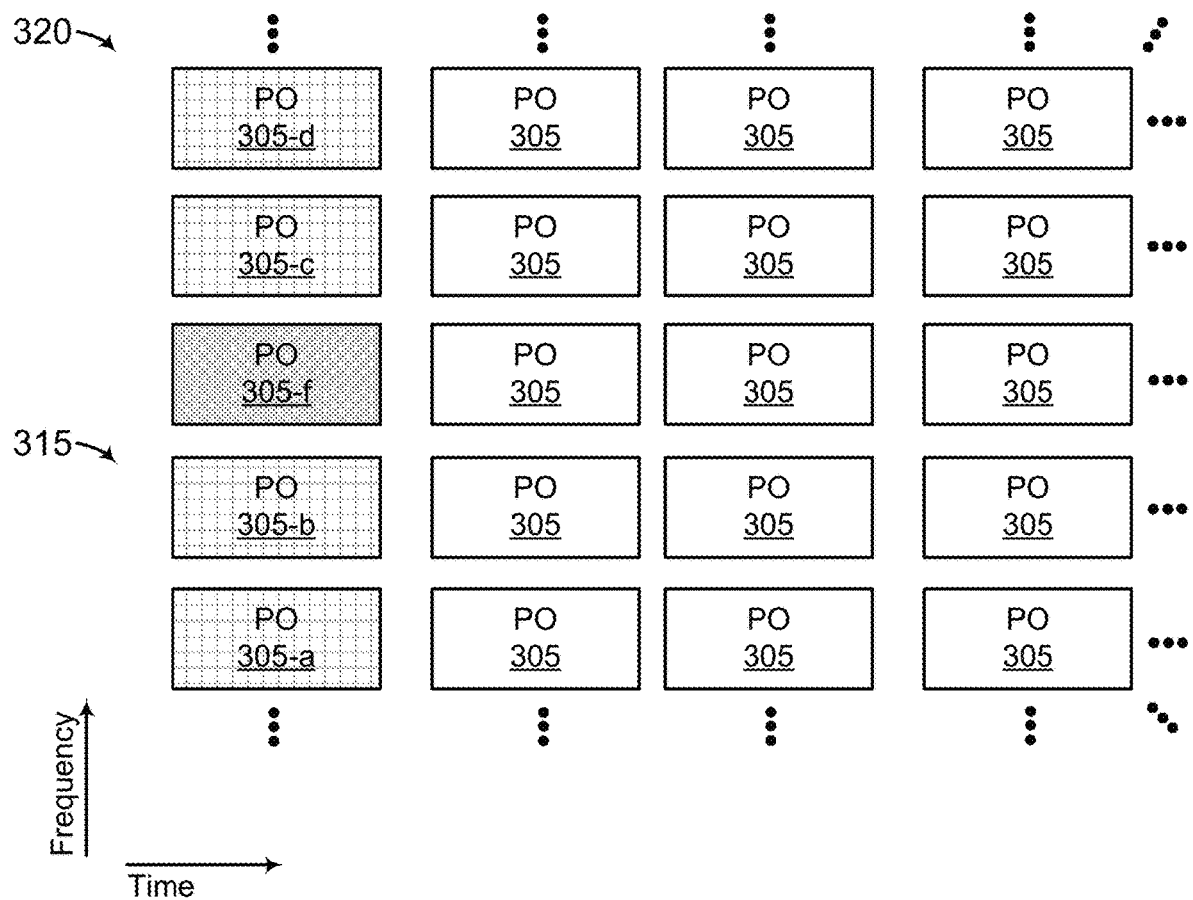
FIGS. 3 through 5 illustrate examples of an aggregation scheme that supports PO aggregation in accordance with aspects of the present disclosure.

FIG. 3 illustrates an example of an aggregation scheme 300 that supports PO aggregation in accordance with aspects of the present disclosure. In some examples, the aggregation scheme 300 may be implemented by aspects of the wireless communications systems 100 and 200, as described with reference to FIGS. 1 and 2. For example, the aggregation scheme 300 may be based on a PO aggregation configuration by a base station (such as the base station 105-a), and implemented by a UE (such as the UE 115-a) for transmitting a random access payload of a random access message, as described with reference to FIGS. 1 and 2.

In the example of FIG. 3, one or more POs 305 may include time and frequency resources for a PUSCH transmission carrying a random access payload. The time and frequency resources, as described herein, may include symbol periods, slots, subcarriers, carriers, among other examples. In some implementations, the POs 305 may each have a same size. In some examples, the UE (for example, the UE 115-a) may aggregate, in a frequency domain, a first subset 315 of the multiple POs 305 and a second subset 320 of the multiple POs 305. In various examples, the POs 305 in each subset may or may not be contiguous in the frequency domain, and the subsets 315 and 320 may or may not be separated from one another by intervening resources (that is, the subsets 315 and 320 themselves may or may not be contiguous). In some such examples, there may be one or more unaggregated POs 305 (for example, PO 305-f) that are between two or more consecutive POs 305 (for example, between POs 305-c and 305-b) to be aggregated in the frequency domain.

In the illustrated examples, the first subset 315 may include PO 305-a and PO 305-b and the second subset 320 may include PO 305-c and PO 305-d. Here, a device such as a UE may aggregate PO 305-a and PO 305-b in the frequency domain, as well as separately aggregate PO 305-c and PO 305-d in the frequency domain. The POs 305-a through 305-d may occur over a same slot, but in different frequencies, for example, in different subcarriers. In some examples, the PO 305-a and the PO 305-b may be contiguous and the PO 305-c and the PO 305-d may also be contiguous. In some examples, however, the first subset 315 including the PO 305-a and the PO 305-b may be noncontiguous to the second subset 320 including the PO 305-c and the PO 305-d. For example, a PO 305-f between the first subset 315 and the second subset 320 may be an unaggregated PO 305.

The described techniques may promote frequency diversity in PO aggregation for PUSCH transmissions carrying a random access payload in two-step random access procedures. The frequency diversity may, for example, be based on dynamic frequency allocation associated with the POs 305 over a temporal period (for example, where a first frequency may be allocated with one or more POs 305 and a second frequency different than the first frequency may be allocated with one or more other POs 305). As a result, the UE may experience increased frequency diversity for random access payload transmissions of a random access message (for example, msgA). Additionally, the described aggregation scheme 300 may support increased data rates and enhanced signaling reliability for random access, among other advantages. Supported aggregation scheme 300 for two-step random access procedure may include features for increased small data transmissions.

Figure 4:
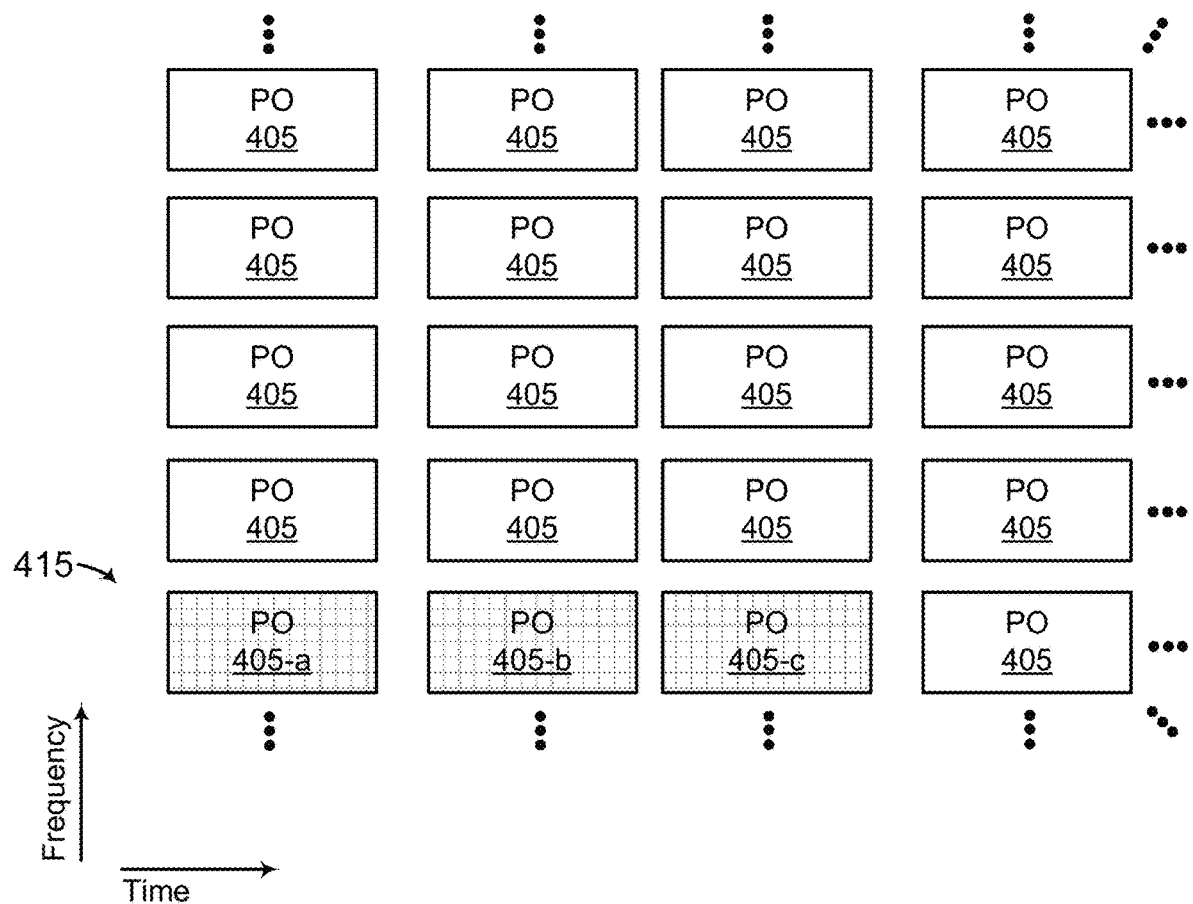

FIG. 4 illustrates an example of an aggregation scheme 400 that supports PO aggregation in accordance with aspects of the present disclosure. In some examples, the aggregation scheme 400 may be implemented by aspects of the wireless communications systems 100 and 200, as described with reference to FIGS. 1 and 2. For example, the aggregation scheme 400 may be based on a PO aggregation configuration by a base station (such as the base station 105-a), and implemented by a UE (such as the UE 115-a) for transmitting a random access payload of a random access message, as described with reference to FIGS. 1 and 2. The aggregation scheme 400 may support increased data rates and enhanced signaling reliability for random access, among other advantages. Supported aggregation scheme 400 for two-step random access procedure may include features for increased small data transmissions.

In the example of FIG. 4, one or more POs 405 may include time and frequency resources for a PUSCH transmission carrying a random access payload. The time and frequency resources, as described herein, may include symbol periods, slots, subcarriers, carriers, among other examples. In some examples, the POs 405 may each have a same size. In some examples, a UE (for example, the UE 115-a) may aggregate, in a time domain, two or more POs 405 of the multiple POs 405. In various examples, the POs 405 may be contiguous or noncontiguous (or a combination of both some contiguous POs 405 and some noncontiguous POs 405). In some examples, a PO 405-a, a PO 405-b, and a PO 405-c may be part of an aggregate set 415. For example, the UE (for example, the UE 115-a) may aggregate the PO 405-a, the PO 405-b, and the PO 405-c in the time domain. The PO 405-a, the PO 405-b, and the PO 405-c may occur over different slots, but on same frequencies, for example, on same subcarriers. In some examples, the PO 405-a, the PO 405-b, and the PO 405-c may be contiguous. In some examples, the PO 405-a, the PO 405-b, and the PO 405-c may be noncontiguous. Additionally or alternatively, there may be one or more unaggregated POs 405 that are between two or more consecutive POs 405 to be aggregated in the time domain.

The described techniques may promote time diversity in PO aggregation for PUSCH transmissions carrying a random access payload in two-step random access procedures. The time diversity may, for example, be based on dynamic resource allocation associated with the POs 405 over a temporal period (for example, where a first resource may be allocated with one or more POs 405 and a second resource different than the first resources may be allocated with one or more other POs 405). As a result, the UE (for example, the UE 115-*a*) may experience increased time diversity for random access payload transmissions of a random access message (for example, msgA).

Figure 5:
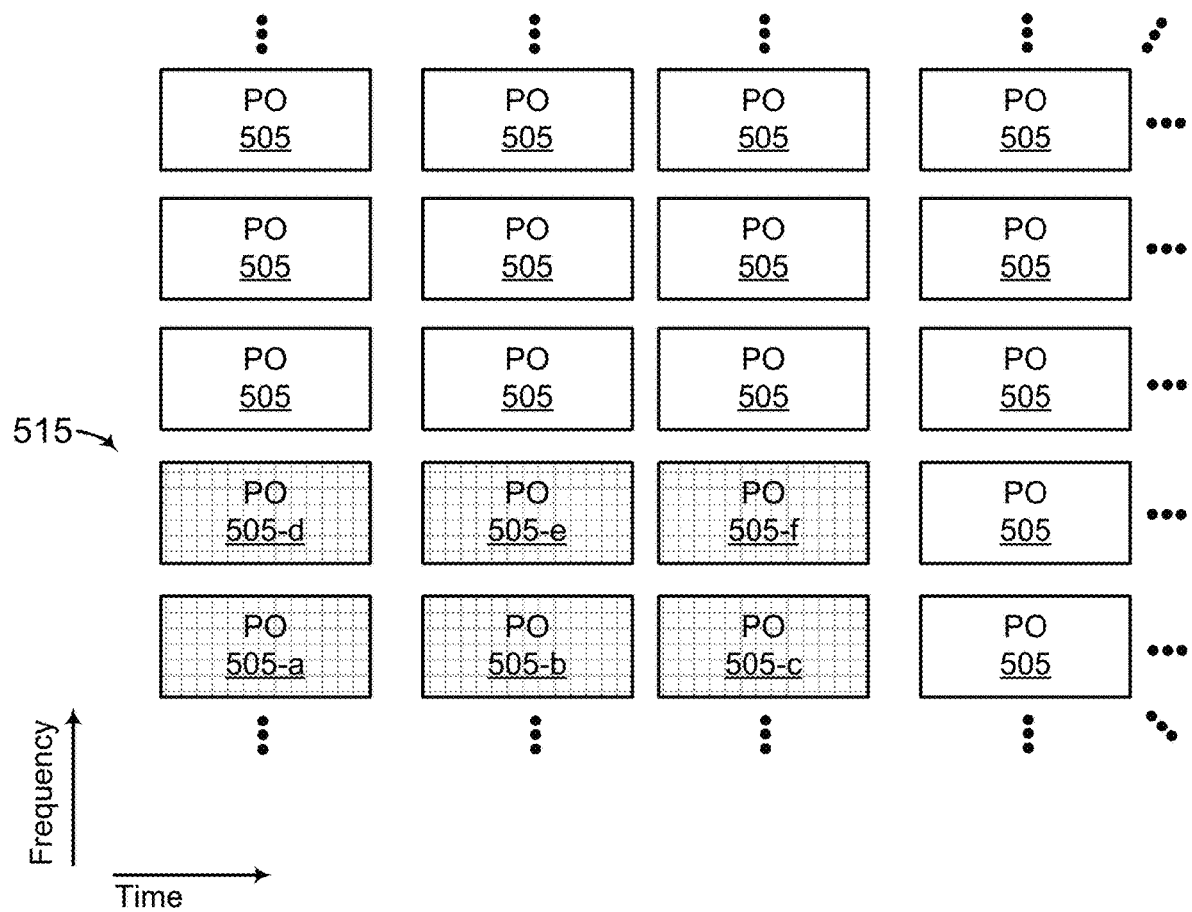

FIG. 5 illustrates an example of an aggregation scheme 500 that supports PO aggregation in accordance with aspects of the present disclosure. In some examples, the aggregation scheme 500 may be implemented by aspects of the wireless communications systems 100 and 200, as described with reference to FIGS. 1 and 2. For example, the aggregation scheme 500 may be based on a PO aggregation configuration by a base station (such as the base station 105-*a*), and implemented by a UE (such as the UE 115-*a*) for transmitting a random access payload of a random access message, as described with reference to FIGS. 1 and 2. In some examples, the aggregation scheme 500 may have POs 505 to be aggregated, localized, or distributed in a time domain and a frequency domain.

In the illustrated example of FIG. 5, one or more POs 505 may include time and frequency resources for a PUSCH transmission carrying a random access payload. The time and frequency resources, as described herein, may include symbol periods, slots, subcarriers, or carriers, among other examples. In some examples, the POs 505 may each have a same size. In some examples, a UE (for example, the UE 115-*a*) may aggregate, in a time domain and a frequency domain, POs 505 of the multiple POs 505. In various examples, the POs 505 may be contiguous or noncontiguous. In some examples, a PO 505-*a*, a PO 505-*b*, a PO 505-*c*, a PO 505-*d*, a PO 505-*e*, and a PO 505-*f* may be part of an aggregate set 515. For example, the UE (for example, the UE 115-*a*) may aggregate the PO 505-*a*, the PO 505-*b*, the PO 505-*c*, the PO 505-*d*, the PO 505-*e*, and the PO 505-*f* in both a time domain and a frequency domain. A portion of the aggregate set of POs 515, for example a number of the PO 505-*a*, the PO 505-*b*, the PO 505-*c*, the PO 505-*d*, the PO 505-*e*, and the PO 505-*f* may occur over same or different slots, as well as on same or different frequencies. In some examples, the PO 505-*a*, the PO 505-*b*, the PO 505-*c*, the PO 505-*d*, the PO 505-*e*, and the PO 505-*f* may be contiguous. In some examples, the PO 505-*a*, the PO 505-*b*, the PO 505-*c*, the PO 505-*d*, the PO 505-*e*, and the PO 505-*f* may be noncontiguous. Additionally or alternatively, there may be one or more unaggregated POs 505 that are between two or more consecutive POs 505 to be aggregated in the time domain and the frequency domain.

The described techniques may promote frequency and time diversity in PO aggregation for PUSCH transmissions carrying a random access payload in two-step random access procedures. The frequency and time diversity may, for example, be based on dynamic resource allocation associated with the POs 505 (for example, where a first resources may be allocated with one or more POs 505 and a second resource different than the first resource may be allocated with one or more other POs 505). As a result, the UE (for example, the UE 115-*a*) may experience increased frequency and time diversity for random access payload transmissions of a random access message (for example, msgA).

Returning to FIG. 2, the UE 115-*a* may multiplex the random access payload of the random access message 205 on time and frequency resources of the aggregated multiple POs, (for example, the aggregate set of POs 515) and transmit the random access payload of the random access message 205 to the base station 105-*a*. In some examples, a PUSCH transmission over aggregated POs (for example, the aggregate set of POs 515) may have a same uplink spatial relation, for example, a same uplink transmit beam. For example, the UE 115-*a* may transmit, to the base station 105-*a*, the random access payload of the random access message 205 on a PUSCH using time and frequency resources of the aggregated multiple POs (for example, the aggregate set of POs 515) and on a same transmit beam. In various examples, the PUSCH transmission over the aggregated POs (for example, the aggregate set of POs 515) may have different uplink spatial relations, for example, different uplink transmit beams. For example, the UE 115-*a* may transmit, to the base station 105-*a*, the random access payload of the random access message 205 on a PUSCH using time and frequency resources of the aggregated multiple POs (for example, the aggregate set of POs 515) and different transmit beams.

The uplink spatial relation may be inferential, for example, and may be inferred from downlink reference signals, or explicitly signaled to the UE 115-*a*. In some examples, the base station 105-*a* may transmit an indication or a reference signal including one or more of a synchronization signal (SS) and a physical broadcast channel (PBCH) block (SSB), or a channel state information reference signal (CSI-RS). The reference signal may be the indication of an uplink spatial relation. In various examples, the base station 105-*a* may transmit the reference signal and the indication of the aggregation configuration over a same transmission. The UE 115-*a* may receive the reference signal and determine an uplink spatial relation and may transmit the random access payload of the random access message 205 on the PUSCH according to the uplink spatial relation.

Upon receiving the random access message 205, the base station 105-*a* may respond appropriately with the random access response message 210. For example, the base station 105-*a* may transmit the random access response message 210 to the UE 115-*a* on a PDCCH or PDSCH. In some examples, the UE 115-*a* may monitor the downlink channel for receiving the random access response message 210 over a configured random access response window. Upon reception of the random access response message 210, the UE 115-*a* may compare an identifier (such as a network identifier) in the random access response message 210 to an identifier specified in the random access message 205. If the identifiers match, the UE 115-*a* may determine that the random access procedure was successful. Otherwise, the UE 115-*a* may consider the random access procedure a failure and may repeat the random access procedure with the base station 105-*a*.

Particular aspects of the wireless communications system 200 described herein may be implemented to realize one or more of the following potential advantages. The described aggregation configuration associated with a two-step random access procedure in the wireless communications system 200 may support decreased power consumption operations for random access, among other advantages. Supported aggregation configurations for two-step random access procedures may include features for small data transmissions. The described techniques may also support increased spectral efficiency and, in some examples, may promote low latency communication associated with random access messaging, among other benefits.

Figure 6:
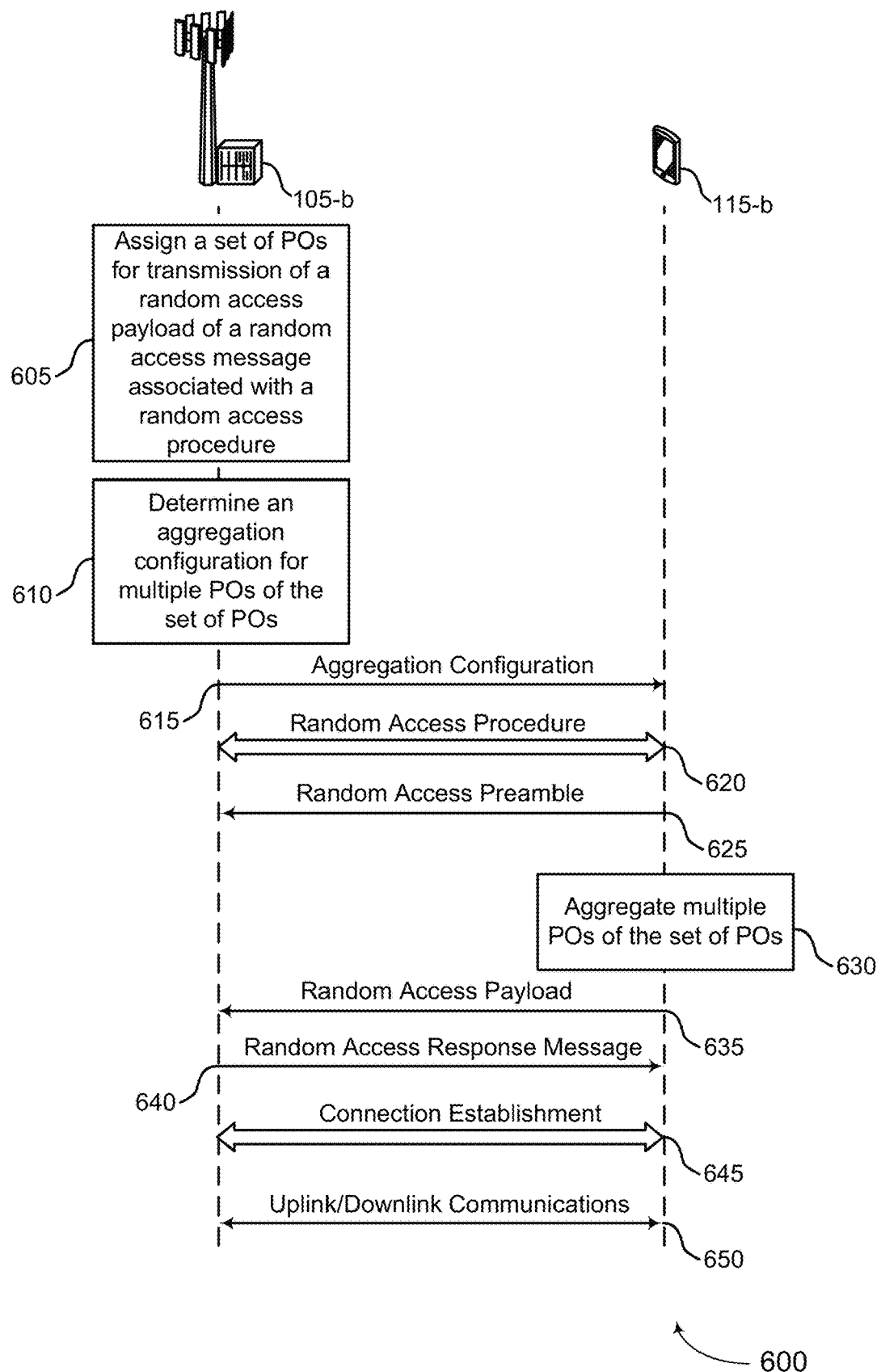
FIG. 6 illustrates an example of a process flow that supports PO aggregation in accordance with aspects of the present disclosure.

FIG. 6 illustrates an example of a process flow 600 that supports PO aggregation in accordance with aspects of the present disclosure. The process flow 600 may be implemented by aspects of the wireless communications systems 100 and 200, as described with reference to FIGS. 1 and 2. For example, the process flow 600 may support PO aggregation in random access procedures, in which sizes of POs may be retained the same and multiple POs may be aggregated for PUSCH transmission. The process flow 600 may include a base station 105-b and a UE 115-b, which may be examples of the corresponding devices described with reference to FIGS. 1 and 2.

In the following description of the process flow 600, the operations between the base station 105-b and the UE 115-b may be performed in a different order than the example order shown, or the operations performed by the base station 105-b and the UE 115-b may be performed in different orders or at different times. Some operations may also be omitted from the process flow 600, and other operations may be added to the process flow 600.

At 605, the base station 105-b may assign a set of POs for transmission of a random access payload of a random access message associated with a random access procedure. At 610, the base station 105-b may determine an aggregation configuration for multiple POs of the set of POs. For example, the base station 105-b may determine a slot format associated with the multiple POs of the set of POs and may determine the aggregation configuration for the multiple POs of the set of POs based on the slot format. In some examples, the base station 105-b may determine a duplex mode associated with the multiple POs of the set of POs and may determine the aggregation configuration for the multiple POs of the set of POs based on the duplex mode. In various examples, the base station 105-b may determine a PUSCH link budget associated with the multiple POs of the set of POs and may determine the aggregation configuration for the multiple POs of the set of POs based on the PUSCH link budget or a UE location within a cell. In some examples, the base station 105-b may determine a PUSCH PAPR associated with the multiple POs of the set of POs and may determine the aggregation configuration for the multiple POs of the set of POs based on the PUSCH PAPR. At 615, the base station 105-b may transmit the aggregation configuration to the UE 115-b. For example, the base station 105-b may transmit a bitmap including one or more bits that correspond to the multiple POs. In various examples, the base station 105-b may transmit an indication of a quantity of POs to aggregate for transmitting the random access payload of the random access message.

At 620, the base station 105-b and the UE 115-b may perform a random access procedure to establish a connection. The base station 105-b and the UE 115-b may support multiple radio access technologies including 4G systems such as LTE systems, LTE-A systems, or LTE-A Pro systems, and 5G systems which may be referred to as NR systems. The random access procedure may correspond to, for example, one or more of the example radio access technologies described herein. In FIG. 6, by way of example, the random access procedure may be a two-step random access procedure related to 5G NR systems, among other examples.

At 625, the UE 115-b may transmit a random access preamble of a random access message (also referred to as msgA) to the base station 105-b. If the random access procedure is a two-step random access procedure, msgA transmitted from the UE 115-b may include a random access preamble and a random access payload. At 630, the UE 115-b may aggregate multiple POs of the set of POs, for example to transmit the random access payload of the msgA. As described herein, the UE 115-b may aggregate multiple POs in one or more of a time domain or a frequency domain. Additionally, the multiple aggregated POs may be contiguous or noncontiguous. At 635, the UE 115-b may transmit, to the base station 105-b, the random access payload of the msgA on a PUSCH using time and frequency resources of the aggregated multiple POs.

At 640, the base station 105-b may transmit a random access message (also referred to as message B (msgB)) to the UE 115-b. The msgB may be a random access response to the received msgA including the random access preamble and the random access payload from the UE 115-b. In some examples, the base station 105-b may transmit the msgB to the UE 115-b based on a UE contention resolution identifier, or a random access RNTI (RA-RNTI), among other examples. For example, as part of the random access procedure, the base station 105-b may transmit the msgB on a PDCCH or a PDSCH according to the RA-RNTI. At 645, the base station 105-b and the UE 115-b may establish the connection. At 650, the base station 105-b and the UE 115-b may communicate uplink communications and downlink communications, such as control information, or data, among other examples.

The operations performed by the base station 105-b and the UE 115-b as part of, but not limited to, process flow 600 may provide improvements to small data transmission in random access procedures. Further the operations performed by the base station 105-b and the UE 115-b as part of, but not limited to, process flow 600 may provide benefits and enhancements to the operation of the UE 115-b. For example, the described PO aggregation in the process flow 600 may support decreased power consumption operations. The described techniques may also support increased spectral efficiency and, in some examples, may promote low latency communication, among other benefits.

Figure 7:
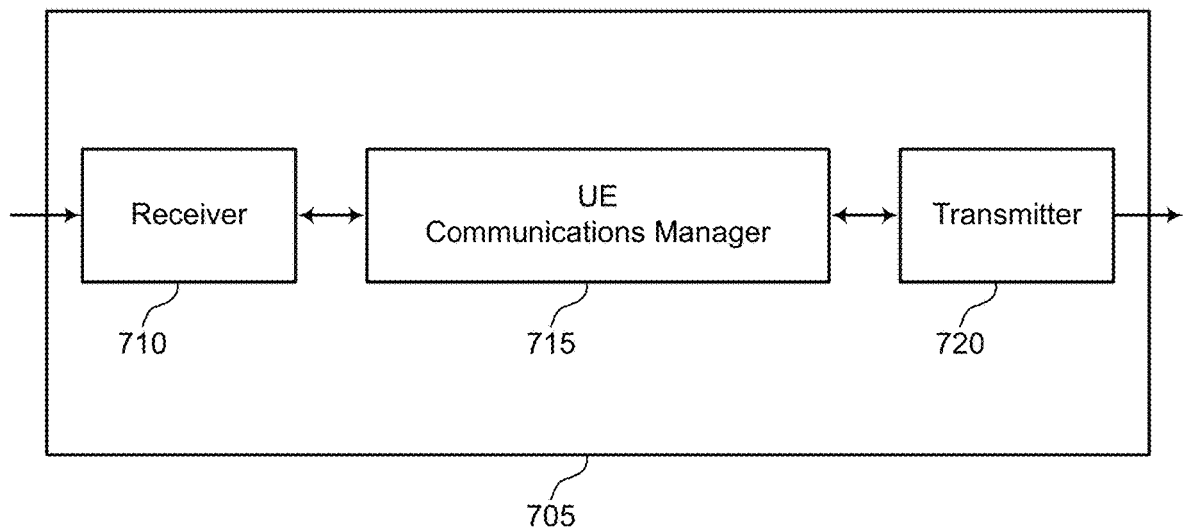
FIGS. 7 and 8 show block diagrams of devices that support PO aggregation in accordance with aspects of the present disclosure.

FIG. 7 shows a block diagram of a device 705 that supports PO aggregation in accordance with aspects of the present disclosure. The device 705 may be an example of aspects of a UE 115 as described herein. The device 705 may include a receiver 710, a UE communications manager 715, and a transmitter 720. The UE communications manager 715 can be implemented, at least in part, by one or both of a modem and a processor. Each of these components may be in communication with one another (such as via one or more buses).

The receiver 710 may receive information such as packets, user data, or control information associated with various information channels (such as control channels, data channels, and information related to PO aggregation). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive, from a base station, signaling including an indication of an aggregation configuration for POs, determine a random access message of a random access procedure, the random access message including a random access preamble and a random access payload, aggregate, in one or more of a time domain or a frequency domain, multiple POs of a set of POs based on the receiving, and transmit, to the base station, the random access payload of the random access message on a PUSCH using time and frequency resources of the aggregated multiple POs.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
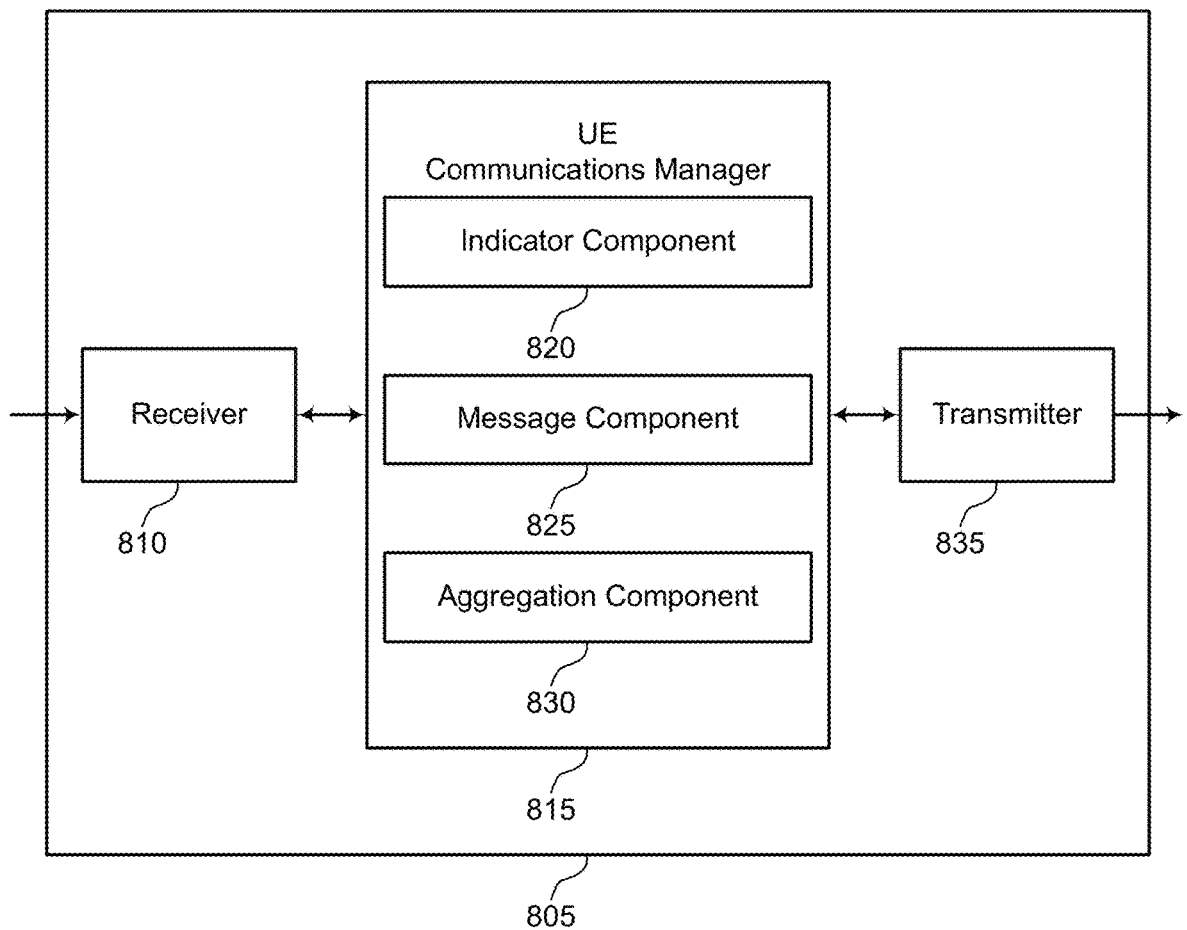

FIG. 8 shows a block diagram of a device 805 that supports PO aggregation in accordance with aspects of the present disclosure. The device 805 may be an example of aspects of a device 705, or a UE 115 as described herein. The device 805 may include a receiver 810, a UE communications manager 815, and a transmitter 835. The UE communications manager 815 can be implemented, at least in part, by one or both of a modem and a processor. Each of these components may be in communication with one another (such as via one or more buses).

The receiver 810 may receive information such as packets, user data, or control information associated with various information channels (such as control channels, data channels, and information related to PO aggregation). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include an indicator component 820, a message component 825, and an aggregation component 830. The UE communications manager 815 may be an example of aspects of the UE communications manager 1010 described herein.

The indicator component 820 may receive, from a base station, signaling including an indication of an aggregation configuration for POs. The message component 825 may determine a random access message of a random access procedure, the random access message including a random access preamble and a random access payload and transmit, to the base station, the random access payload of the random access message on a PUSCH using time and frequency resources of the aggregated multiple POs. The aggregation component 830 may aggregate, in one or more of a time domain or a frequency domain, multiple POs of a set of POs based on the receiving.

The transmitter 835 may transmit signals generated by other components of the device 805. In some examples, the transmitter 835 may be collocated with a receiver 810 in a transceiver component. For example, the transmitter 835 may be an example of aspects of the transceiver 1020 described with reference to FIG. 10. The transmitter 835 may utilize a single antenna or a set of antennas.

Figure 9:
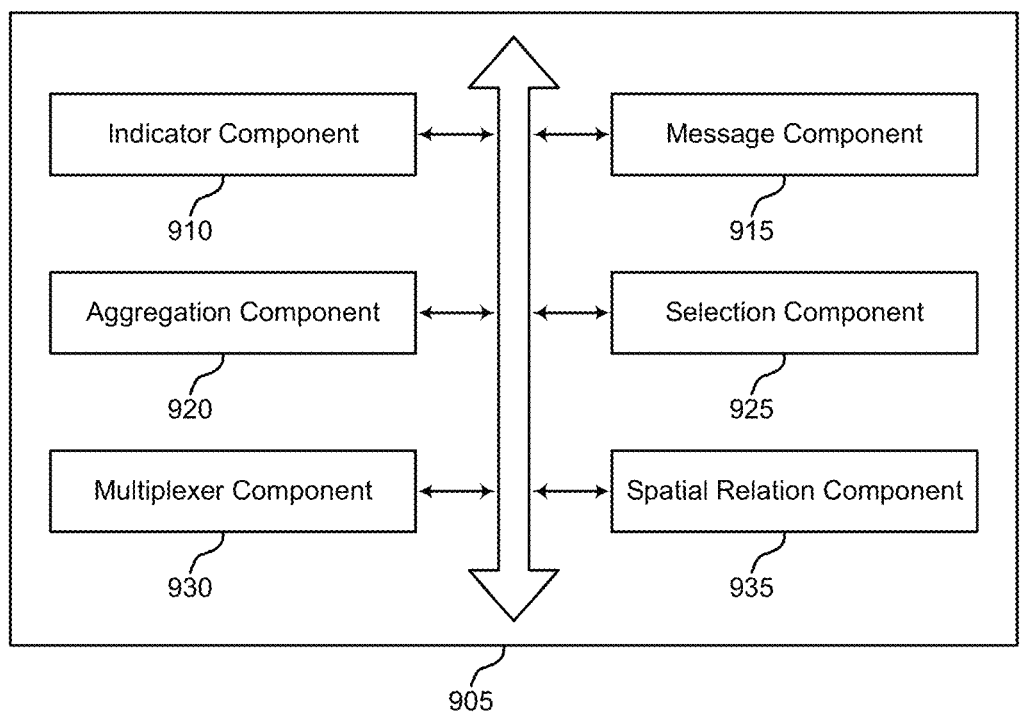
FIG. 9 shows a block diagram of a UE communications manager that supports PO aggregation in accordance with aspects of the present disclosure.

FIG. 9 shows a block diagram of a UE communications manager 905 that supports PO occasion aggregation in accordance with aspects of the present disclosure. The UE communications manager 905 may be an example of aspects of a UE communications manager 715, a UE communications manager 815, or a UE communications manager 1010 described herein. The UE communications manager 905 may include an indicator component 910, a message component 915, an aggregation component 920, a selection component 925, a multiplexer component 930, and a spatial relation component 935. Each of these components may communicate, directly or indirectly, with one another (such as via one or more buses).

The indicator component 910 may receive, from a base station, signaling including an indication of an aggregation configuration for POs. In some examples, the indicator component 910 may receive a bitmap including one or more bits that correspond to the multiple POs. In some examples, the indicator component 910 may receive an indication of a quantity of POs to aggregate for transmitting the random access payload of the random access message.

The message component 915 may determine a random access message of a random access procedure, the random access message including a random access preamble and a random access payload. In some examples, the message component 915 may transmit, to the base station, the random access payload of the random access message on a PUSCH using time and frequency resources of the aggregated multiple POs. In some examples, the random access procedure includes a two-step random access procedure. Transmitting, to the base station, the random access payload of the random access message on the PUSCH may be further based on an uplink spatial relation. In some examples, the transmission of the random access payload of the random access message on the PUSCH using the time and frequency resources of the aggregated multiple POs have a same uplink spatial relation.

For example, the message component 915 may transmit, to the base station, the random access payload of the random access message on the PUSCH using time and frequency resources of the aggregated multiple POs using a same transmit beam based on the POs in the aggregated multiple POs having a same uplink spatial relation. In some examples, the transmission of the random access payload of the random access message on the PUSCH using the time and frequency resources of the aggregated multiple POs have different uplink spatial relations. For example, the message component 915 may transmit, to the base station, the random access payload of the random access message on the PUSCH using time and frequency resources of the aggregated multiple POs using different transmit beams based on the POs in the aggregated multiple POs having different uplink spatial relations.

The aggregation component 920 may aggregate, in one or more of a time domain or a frequency domain, multiple POs of a set of POs based on the receiving. In some examples, the aggregation component 920 may aggregate a first subset of the multiple POs of the set of POs in the frequency domain. In some examples, the aggregation component 920 may aggregate a second subset of the multiple POs of the set of POs in the frequency domain. In some examples, the aggregation component 920 may aggregate multiple POs that are contiguous in one or more of the time domain or the frequency domain. In some examples, the aggregation component 920 may aggregate multiple POs that are noncontiguous in one or more of the time domain or the frequency domain. In some examples, the aggregation component 920 may aggregate two or more POs of the multiple POs of the set of POs in the time domain. In some examples, the aggregation component 920 may aggregate the multiple POs of the set of POs is based on a size of the random access payload. In some examples, the POs in the set of POs have a same size.

In some examples, the aggregation component 920 may aggregate the multiple POs of the set of POs in one or more of the time domain or the frequency domain based on the bitmap. In some examples, the aggregation component 920 may aggregate the multiple POs of the set of POs in one or more of the time domain or the frequency domain based on the indication of the quantity of POs. In some examples, aggregating the multiple POs of the set of POs includes aggregating the selected quantity of POs based on the selecting. The selected quantity of POs includes the multiple POs of the set of POs.

The selection component 925 may select the quantity of POs within the set of POs based on one or more criteria and the indication of the quantity of POs. In some examples, the one or more criteria includes one or more of a slot format, a duplex mode, a PUSCH link budget, a UE location within a cell, or a PUSCH PAPR. The multiplexer component 930 may multiplex the random access payload of the random access message on the time and frequency resources of the aggregated multiple POs. In some examples, transmitting, to the base station, the random access payload of the random access message may be based on the multiplexing.

The spatial relation component 935 may receive, from the base station, a reference signal. In some examples, the spatial relation component 935 may determine an uplink spatial relation of the PUSCH in the aggregated multiple POs based on receiving the reference signal. In some examples, the spatial relation component 935 may receive, from the base station, an indication including an uplink spatial relation of the PUSCH in the aggregated multiple POs. In some examples, the reference signal includes one or more of an SSB, or a CSI-RS.

Figure 10:
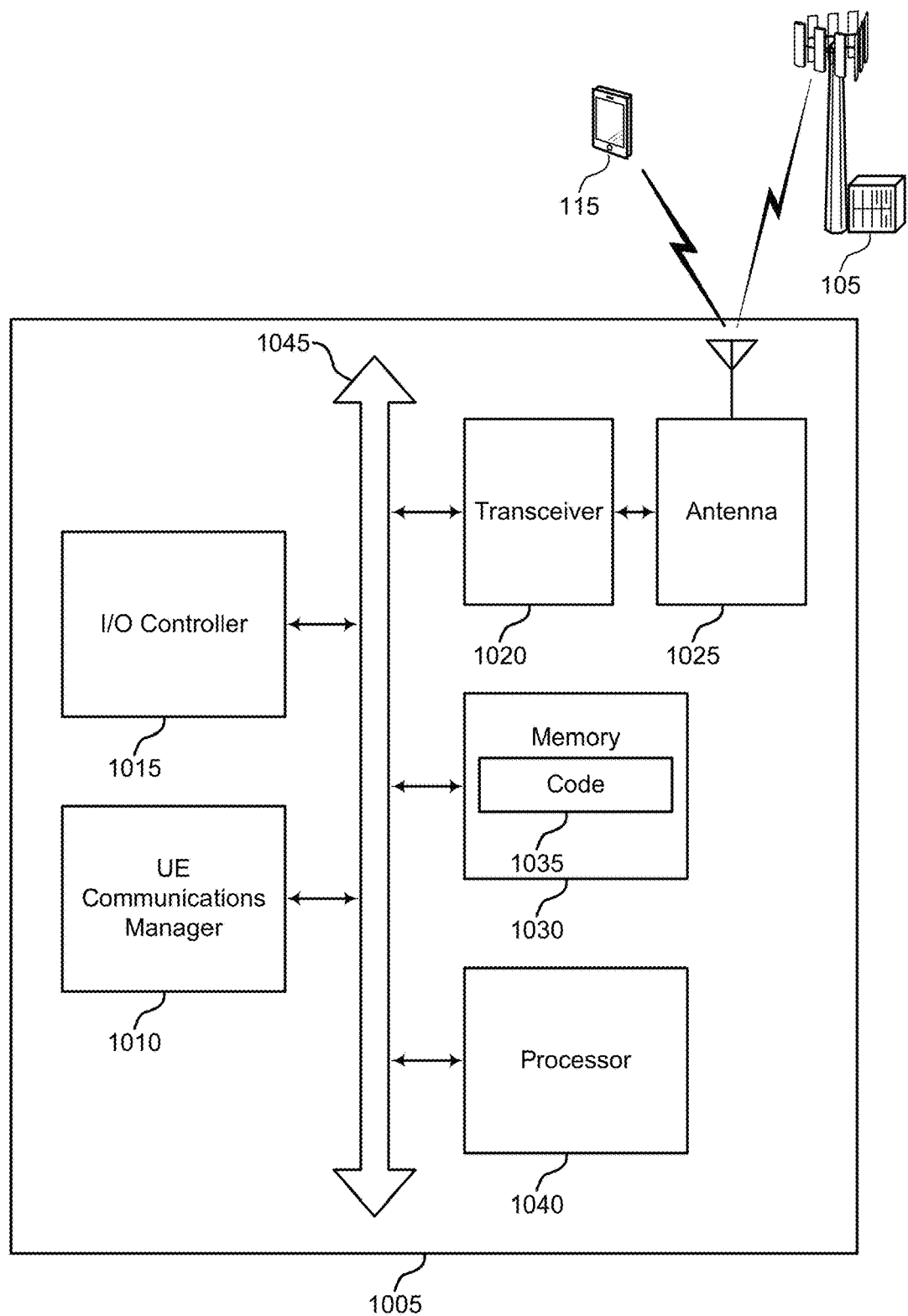
FIG. 10 shows a diagram of a system including a device that supports PO aggregation in accordance with aspects of the present disclosure.

FIG. 10 shows a diagram of a system 1000 including a device 1005 that supports PO aggregation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (such as bus 1045).

The UE communications manager 1010 may receive, from a base station, signaling including an indication of an aggregation configuration for POs, determine a random access message of a random access procedure, the random access message including a random access preamble and a random access payload, aggregate, in one or more of a time domain or a frequency domain, multiple POs of a set of POs based on the receiving, and transmit, to the base station, the random access payload of the random access message on a PUSCH using time and frequency resources of the aggregated multiple POs.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In some examples, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some examples, the device 1005 may include a single antenna 1025. However, in some examples, the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, if executed, cause the processor to perform various functions described herein. In some examples, the memory 1030 may contain, among other things, a basic input/basic output system (BIOS) which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (such as if compiled and executed) to perform functions described herein.

The processor 1040 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some examples, the processor 1040 may be configured to operate a memory array using a memory controller. In some examples, a memory controller may be integrated into the processor 1040. The processor 1040 may be configured to execute computer-readable instructions stored in a memory (such as the memory 1030) to cause the device 1005 to perform various functions (such as functions or tasks supporting PO aggregation).

Figure 11:
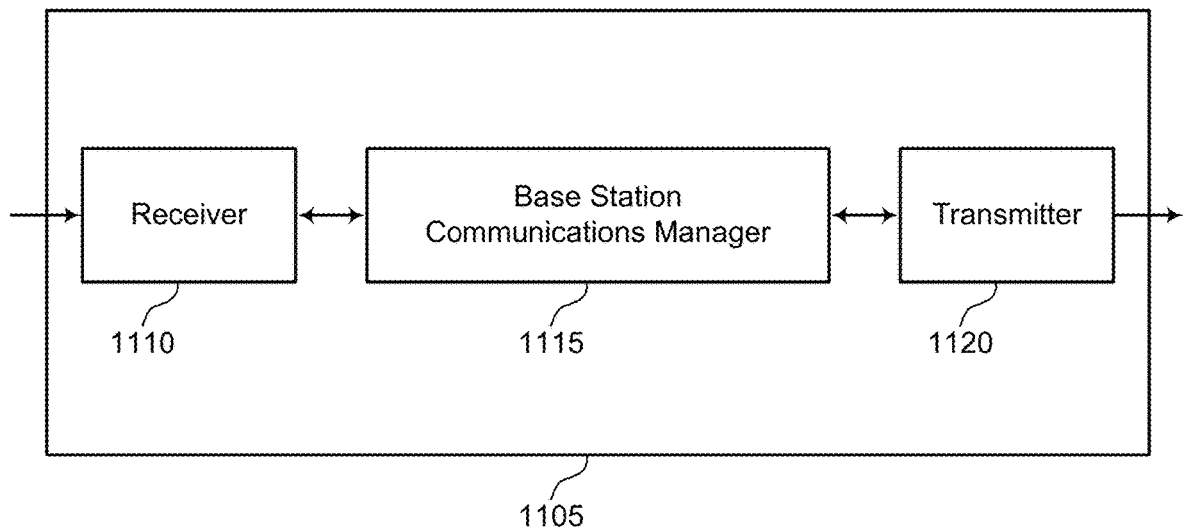
FIGS. 11 and 12 show block diagrams of devices that support PO aggregation in accordance with aspects of the present disclosure.

FIG. 11 shows a block diagram of a device 1105 that supports PO aggregation in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (such as via one or more buses).

The receiver 1110 may receive information such as packets, user data, or control information associated with various information channels (such as control channels, data channels, and information related to PO aggregation). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may assign a set of POs for transmission of a random access payload of a random access message associated with a random access procedure, determine, in one or more of a time domain or a frequency domain, an aggregation configuration for multiple POs of the set of POs based on the assigning, and transmit, to a UE, signaling including an indication of the aggregation configuration for POs.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
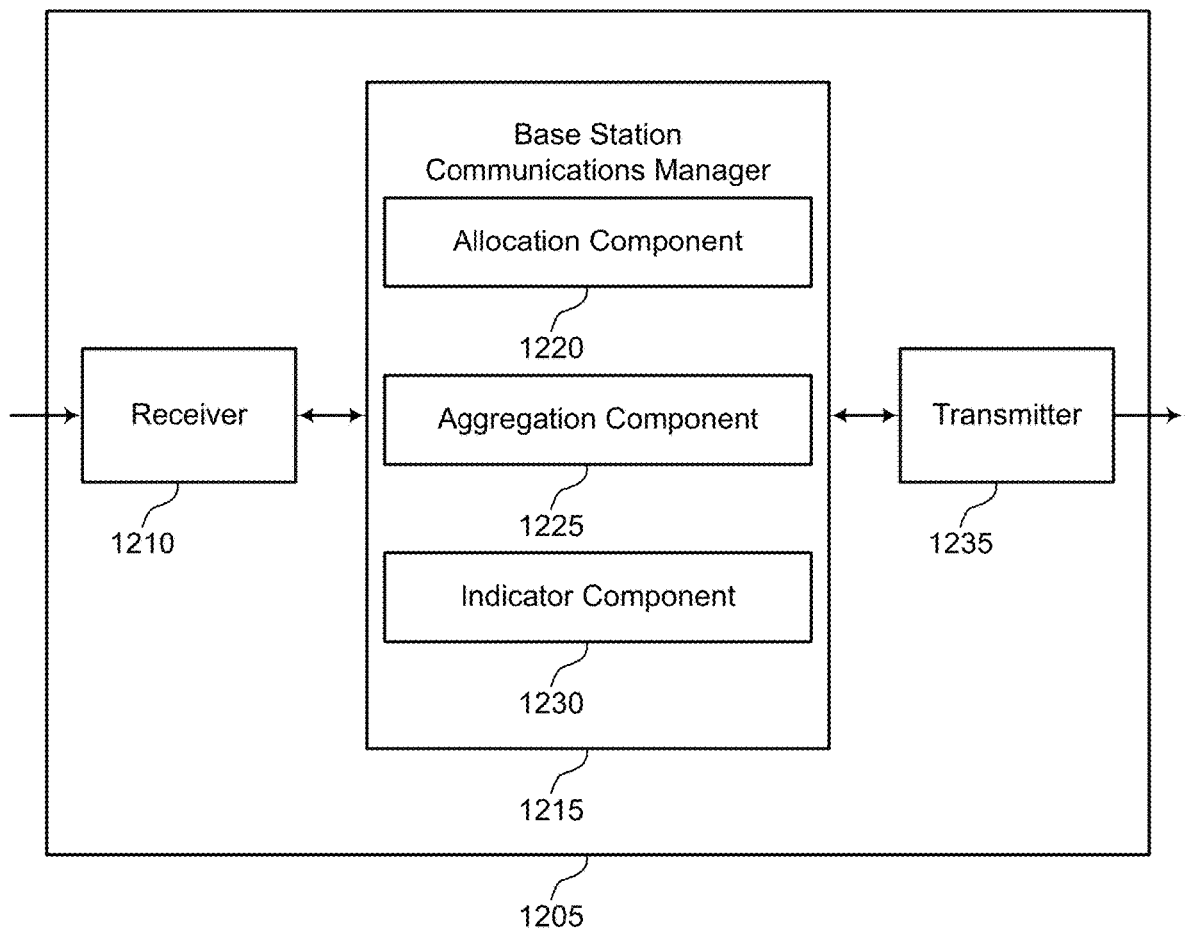

FIG. 12 shows a block diagram of a device 1205 that supports PO aggregation in accordance with aspects of the present disclosure. The device 1205 may be an example of aspects of a device 1105, or a base station 105 as described herein. The device 1205 may include a receiver 1210, a base station communications manager 1215, and a transmitter 1235. The base station communications manager 1215 can be implemented, at least in part, by one or both of a modem and a processor. Each of these components may be in communication with one another (such as via one or more buses).

The receiver 1210 may receive information such as packets, user data, or control information associated with various information channels (such as control channels, data channels, and information related to PO aggregation). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include an allocation component 1220, an aggregation component 1225, and an indicator component 1230. The base station communications manager 1215 may be an example of aspects of the base station communications manager 1410 described herein.

The allocation component 1220 may assign a set of POs for transmission of a random access payload of a random access message associated with a random access procedure. The aggregation component 1225 may determine, in one or more of a time domain or a frequency domain, an aggregation configuration for multiple POs of the set of POs based on the assigning. The indicator component 1230 may transmit, to a UE, signaling including an indication of the aggregation configuration for POs.

The transmitter 1235 may transmit signals generated by other components of the device 1205. In some examples, the transmitter 1235 may be collocated with a receiver 1210 in a transceiver component. For example, the transmitter 1235 may be an example of aspects of the transceiver 1420 described with reference to FIG. 14. The transmitter 1235 may utilize a single antenna or a set of antennas.

Figure 13:
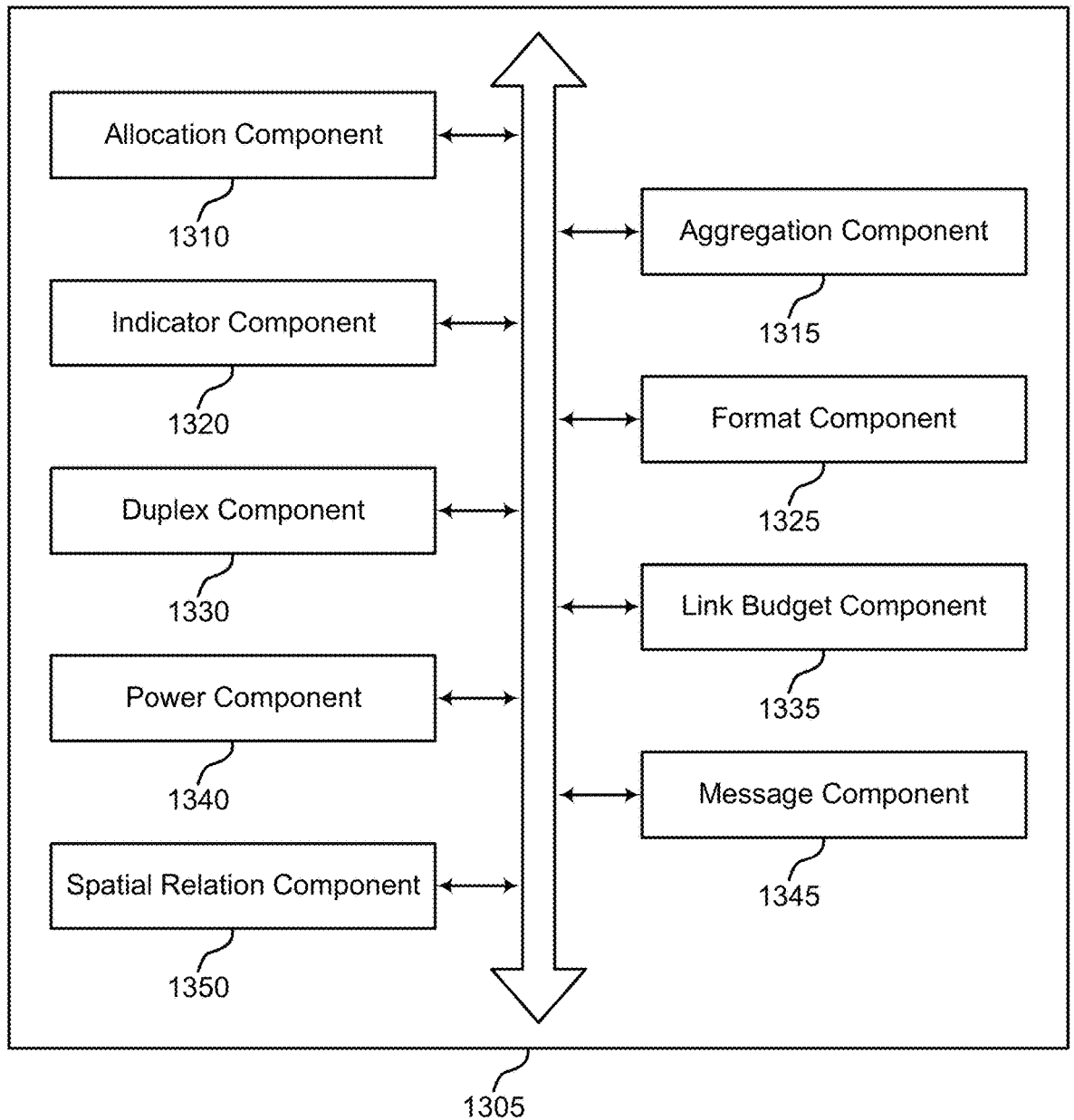
FIG. 13 shows a block diagram of a base station communications manager that supports PO aggregation in accordance with aspects of the present disclosure.

FIG. 13 shows a block diagram of a base station communications manager 1305 that supports PO aggregation in accordance with aspects of the present disclosure. The base station communications manager 1305 may be an example of aspects of a base station communications manager 1115, a base station communications manager 1215, or a base station communications manager 1410 described herein. The base station communications manager 1305 may include an allocation component 1310, an aggregation component 1315, an indicator component 1320, a format component 1325, a duplex component 1330, a link budget component 1335, a power component 1340, a message component 1345, and a spatial relation component 1350. Each of these components may communicate, directly or indirectly, with one another (such as via one or more buses).

The allocation component 1310 may assign a set of POs for transmission of a random access payload of a random access message associated with a random access procedure. The random access procedure may include a two-step random access procedure.

The aggregation component 1315 may determine, in one or more of a time domain or a frequency domain, an aggregation configuration for multiple POs of the set of POs based on the assigning. In some examples, the aggregation component 1315 may determine the aggregation configuration for the multiple POs of the set of POs based on a slot format. In some other examples, the aggregation component 1315 may determine the aggregation configuration for the multiple POs of the set of POs based on a duplex mode. In some examples, the aggregation component 1315 may determine the aggregation configuration for the multiple POs of the set of POs based on a PUSCH link budget or a UE location within a cell. In some other examples, the aggregation component 1315 may in which determining the aggregation configuration for the multiple POs of the set of POs is further based on the PUSCH PAPR. In some examples, the POs in the set of POs have a same size. In some other examples, the multiple POs of the set of POs are contiguous. In some examples, the multiple POs of the set of POs are noncontiguous.

The indicator component 1320 may transmit, to a UE, signaling including an indication of the aggregation configuration for POs. In some examples, the indicator component 1320 may transmit a bitmap including one or more bits that correspond to the multiple POs. In some examples, the indicator component 1320 may transmit an indication of a quantity of POs to aggregate for transmitting the random access payload of the random access message.

The format component 1325 may determine the slot format associated with the multiple POs of the set of POs. The duplex component 1330 may determine the duplex mode associated with the multiple POs of the set of POs. The link budget component 1335 may determine the PUSCH link budget associated with the multiple POs of the set of POs. The power component 1340 may determine the PUSCH PAPR ratio associated with the multiple POs of the set of POs.

The message component 1345 may receive, from the UE, the random access payload of the random access message carried on a PUSCH and on time and frequency resources of aggregated multiple POs. In some examples, the PUSCH in the aggregated multiple POs have a same uplink spatial relation. In some examples, the PUSCH in the aggregated multiple POs have different uplink spatial relations.

The spatial relation component 1350 may transmit, to the UE, a reference signal including one or more of an SSB or a CSI-RS. In some examples, the reference signal includes an indication including an uplink spatial relation of a PUSCH in the multiple POs of the set of POs. In some examples, the spatial relation component 1350 may transmit, to the UE, the reference signal and the indication of the aggregation configuration over a same transmission. In some examples, the spatial relation component 1350 may transmit, to the UE, an indication including an uplink spatial relation of a PUSCH in the multiple POs of the set of POs.

Figure 14:
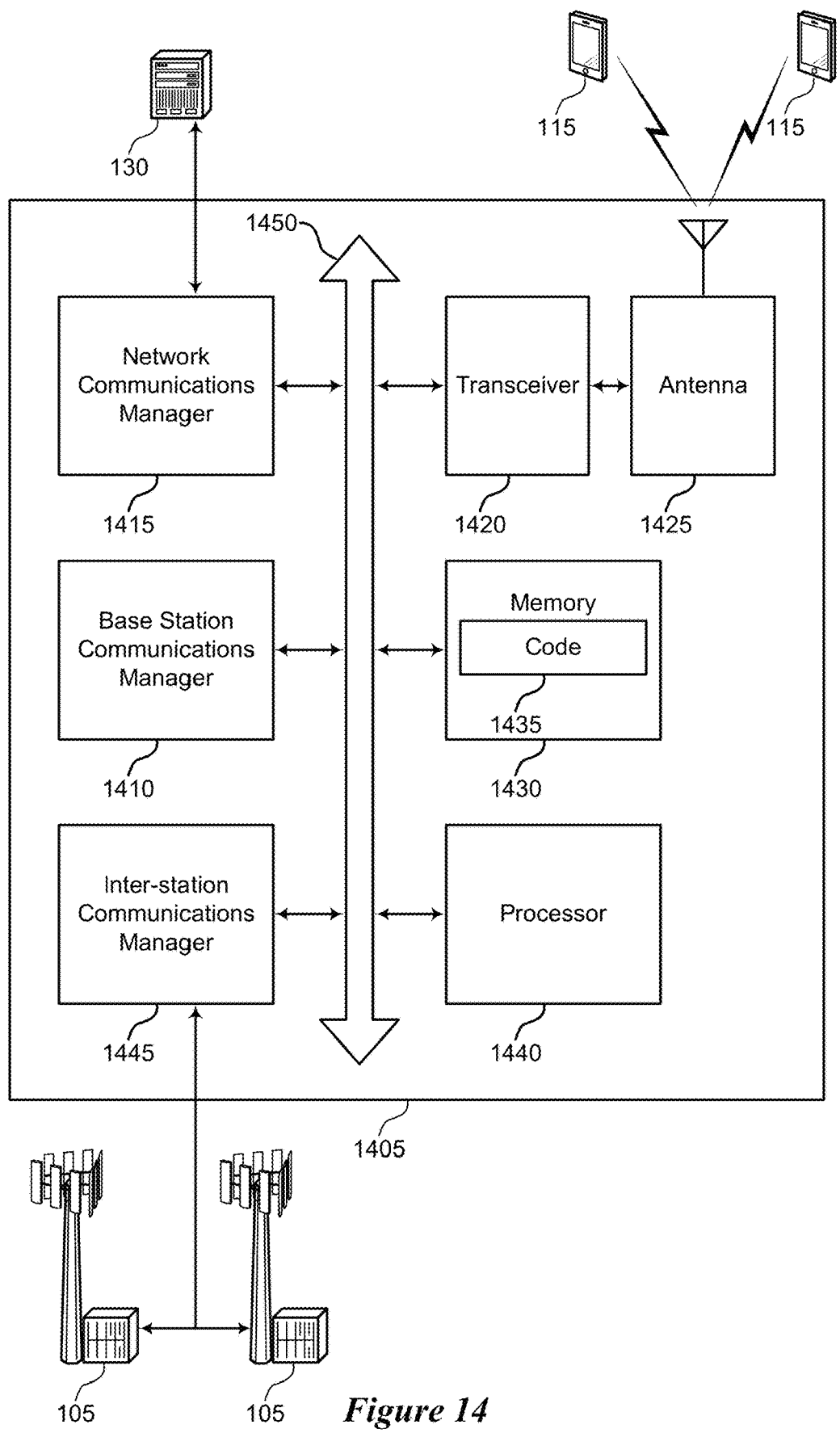
FIG. 14 shows a diagram of a system including a device that supports PO aggregation in accordance with aspects of the present disclosure.

FIG. 14 shows a diagram of a system 1400 including a device 1405 that supports PO aggregation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (such as bus 1450).

The base station communications manager 1410 may assign a set of POs for transmission of a random access payload of a random access message associated with a random access procedure, determine, in one or more of a time domain or a frequency domain, an aggregation configuration for multiple POs of the set of POs based on the assigning, and transmit, to a user equipment, signaling including an indication of the aggregation configuration for POs.

The network communications manager 1415 may manage communications with the core network (such as via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some examples, the device 1405 may include a single antenna 1425. However, in some other examples, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, if executed by a processor (such as the processor 1440) cause the device to perform various functions described herein. In some examples, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (such as if compiled and executed) to perform functions described herein.

The processor 1440 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some other examples, a memory controller may be integrated into processor 1440. The processor 1440 may be configured to execute computer-readable instructions stored in a memory (such as the memory 1430) to cause the device 1405 to perform various functions (such as functions or tasks supporting PO aggregation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
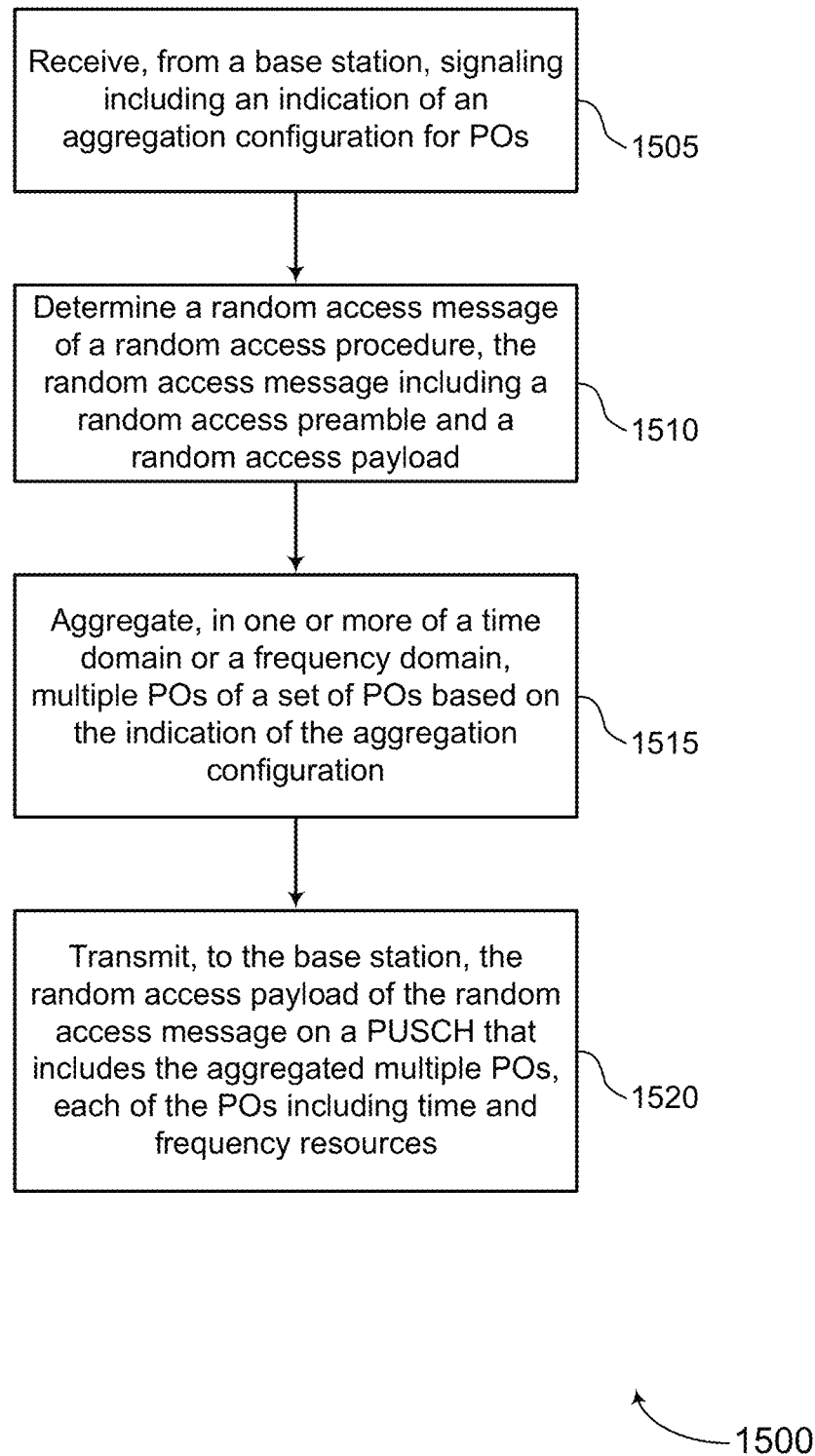
FIGS. 15 through 20 show flowcharts illustrating methods that support PO aggregation in accordance with aspects of the present disclosure.

FIG. 15 shows a flowchart illustrating a method 1500 that supports PO aggregation in accordance with aspects of the present disclosure. The operations of method 1500 may be implemented by a UE 115 or its components as described herein. For example, the operations of method 1500 may be performed by a communications manager as described with reference to FIGS. 7-10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, signaling including an indication of an aggregation configuration for POs. The operations of 1505 may be performed according to the methods described herein. In some examples, aspects of the operations of 1505 may be performed by an indicator component as described with reference to FIGS. 7-10.

At 1510, the UE may determine a random access message of a random access procedure, the random access message including a random access preamble and a random access payload. The operations of 1510 may be performed according to the methods described herein. In some examples, aspects of the operations of 1510 may be performed by a message component as described with reference to FIGS. 7-10.

At 1515, the UE may aggregate, in one or more of a time domain or a frequency domain, multiple POs of a set of POs based on the receiving. The operations of 1515 may be performed according to the methods described herein. In some examples, aspects of the operations of 1515 may be performed by an aggregation component as described with reference to FIGS. 7-10.

At 1520, the UE may transmit, to the base station, the random access payload of the random access message on a PUSCH using time and frequency resources of the aggregated multiple POs. The operations of 1520 may be performed according to the methods described herein. In some examples, aspects of the operations of 1520 may be performed by a message component as described with reference to FIGS. 7-10.

Figure 16:
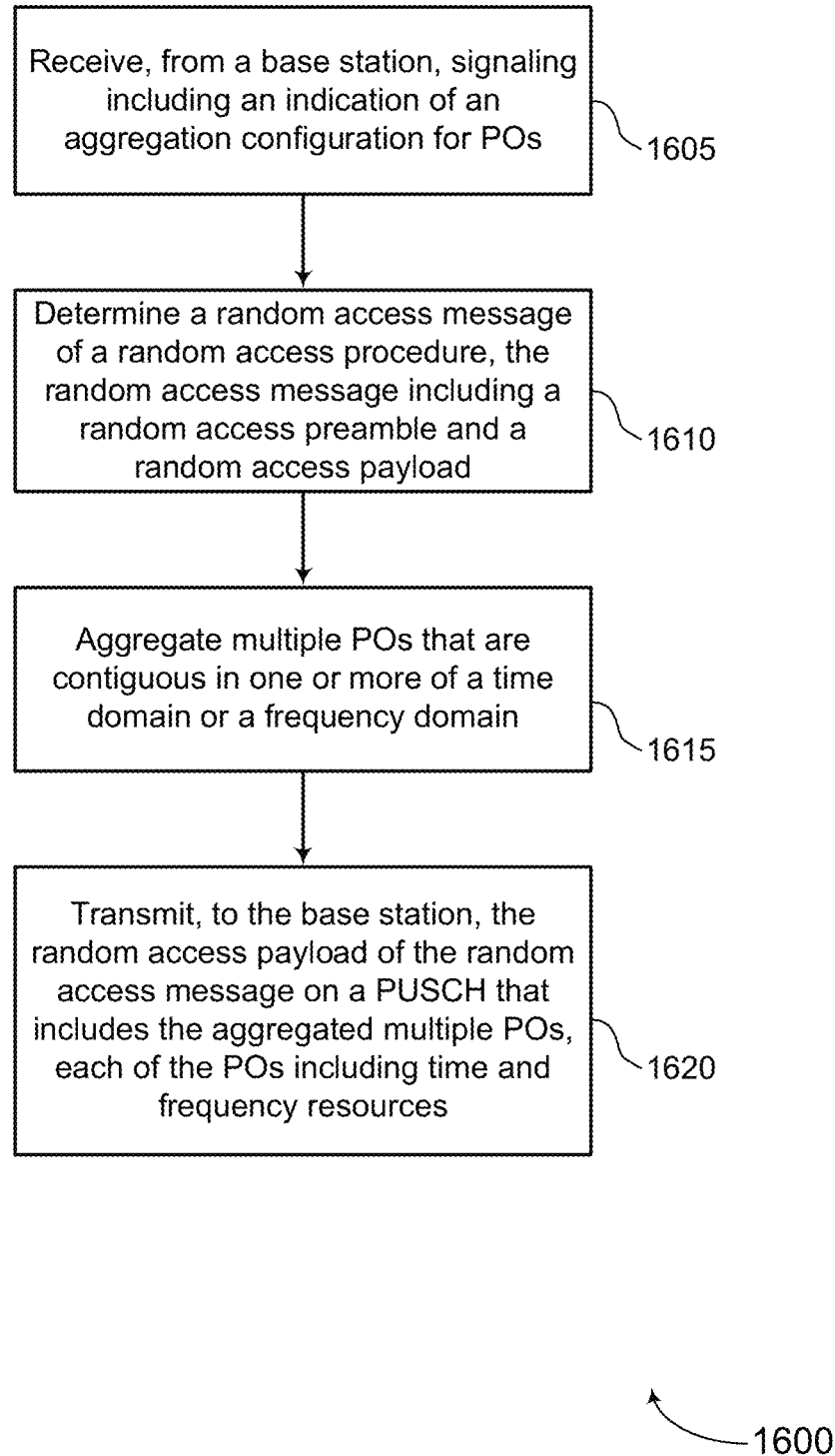

FIG. 16 shows a flowchart illustrating a method 1600 that supports PO aggregation in accordance with aspects of the present disclosure. The operations of method 1600 may be implemented by a UE 115 or its components as described herein. For example, the operations of method 1600 may be performed by a communications manager as described with reference to FIGS. 7-10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, signaling including an indication of an aggregation configuration for POs. The operations of 1605 may be performed according to the methods described herein. In some examples, aspects of the operations of 1605 may be performed by an indicator component as described with reference to FIGS. 7-10.

At 1610, the UE may determine a random access message of a random access procedure, the random access message including a random access preamble and a random access payload. The operations of 1610 may be performed according to the methods described herein. In some examples, aspects of the operations of 1610 may be performed by a message component as described with reference to FIGS. 7-10.

At 1615, the UE may aggregate multiple POs that are contiguous in one or more of a time domain or a frequency domain. The operations of 1615 may be performed according to the methods described herein. In some examples, aspects of the operations of 1615 may be performed by an aggregation component as described with reference to FIGS. 7-10.

At 1620, the UE may transmit, to the base station, the random access payload of the random access message on a PUSCH using time and frequency resources of the aggregated multiple POs. The operations of 1620 may be performed according to the methods described herein. In some examples, aspects of the operations of 1620 may be performed by a message component as described with reference to FIGS. 7-10.

Figure 17:
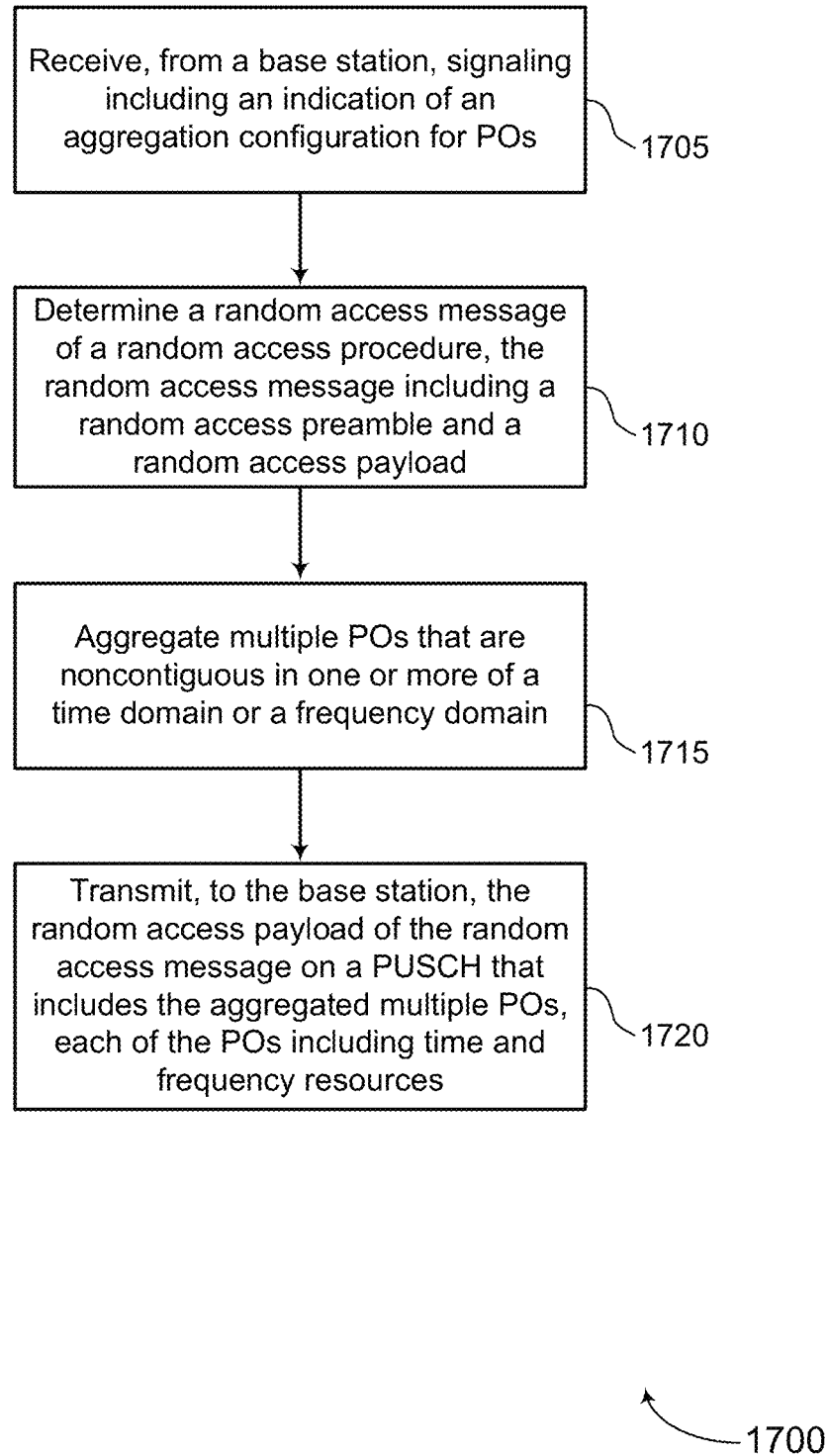

FIG. 17 shows a flowchart illustrating a method 1700 that supports PO aggregation in accordance with aspects of the present disclosure. The operations of method 1700 may be implemented by a UE 115 or its components as described herein. For example, the operations of method 1700 may be performed by a communications manager as described with reference to FIGS. 7-10. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, signaling including an indication of an aggregation configuration for POs. The operations of 1705 may be performed according to the methods described herein. In some examples, aspects of the operations of 1705 may be performed by an indicator component as described with reference to FIGS. 7-10.

At 1710, the UE may determine a random access message of a random access procedure, the random access message including a random access preamble and a random access payload. The operations of 1710 may be performed according to the methods described herein. In some examples, aspects of the operations of 1710 may be performed by a message component as described with reference to FIGS. 7-10.

At 1715, the UE may aggregate multiple POs that are noncontiguous in one or more of a time domain or a frequency domain. The operations of 1715 may be performed according to the methods described herein. In some examples, aspects of the operations of 1715 may be performed by an aggregation component as described with reference to FIGS. 7-10.

At 1725, the UE may transmit, to the base station, the random access payload of the random access message on a PUSCH using time and frequency resources of the aggregated multiple POs. The operations of 1725 may be performed according to the methods described herein. In some examples, aspects of the operations of 1725 may be performed by a message component as described with reference to FIGS. 7-10.

Figure 18:
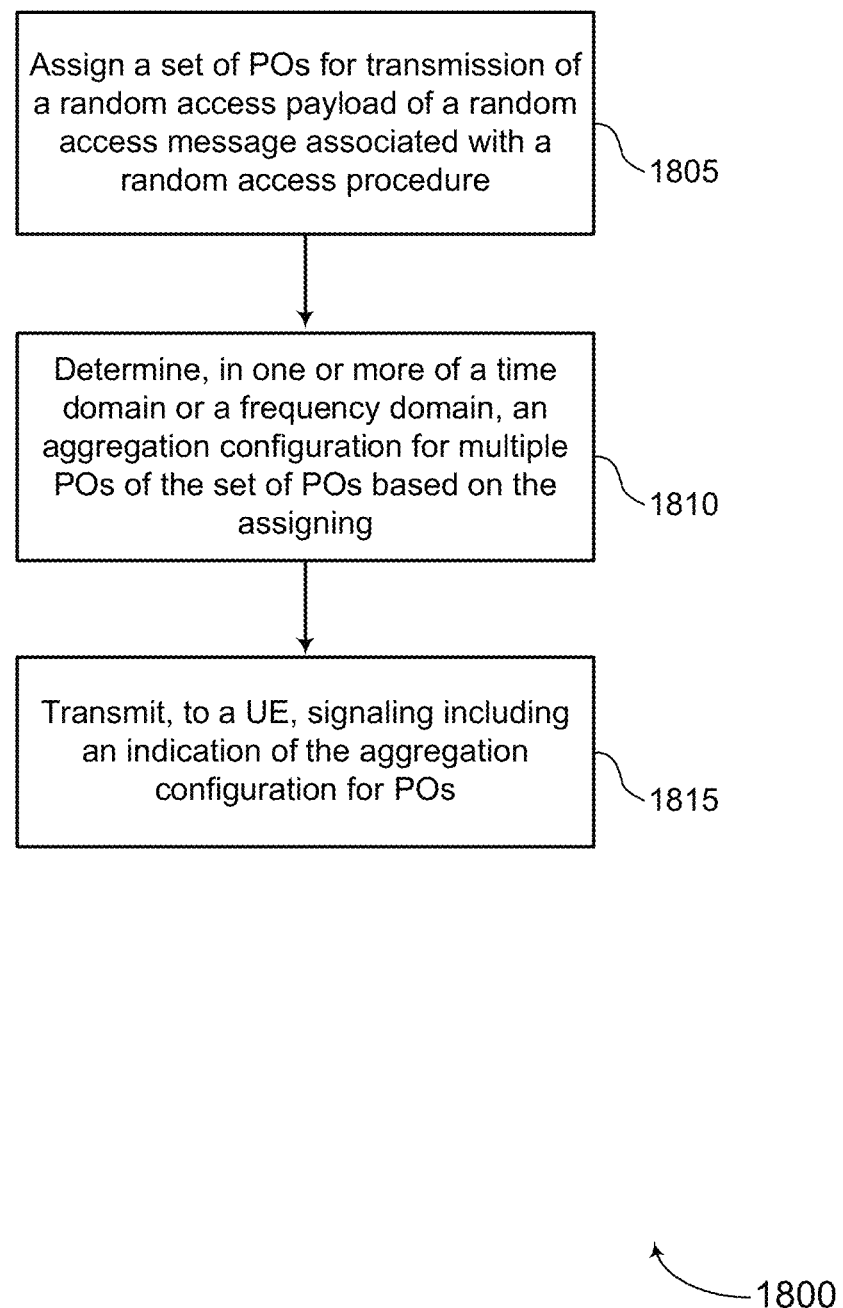

FIG. 18 shows a flowchart illustrating a method 1800 that supports PO aggregation in accordance with aspects of the present disclosure. The operations of method 1800 may be implemented by a base station 105 or its components as described herein. For example, the operations of method 1800 may be performed by a communications manager as described with reference to FIGS. 11-14. In some examples, a base station may execute a set of instructions to control the functional elements of the base station to perform the functions described herein. Additionally or alternatively, a base station may perform aspects of the functions described herein using special-purpose hardware.

At 1805, the base station may assign a set of POs for transmission of a random access payload of a random access message associated with a random access procedure. The operations of 1805 may be performed according to the methods described herein. In some examples, aspects of the operations of 1805 may be performed by an allocation component as described with reference to FIGS. 11-14.

At 1810, the base station may determine, in one or more of a time domain or a frequency domain, an aggregation configuration for multiple POs of the set of POs based on the assigning. The operations of 1810 may be performed according to the methods described herein. In some examples, aspects of the operations of 1810 may be performed by an aggregation component as described with reference to FIGS. 11-14.

At 1815, the base station may transmit, to a UE, signaling including an indication of the aggregation configuration for POs. The operations of 1815 may be performed according to the methods described herein. In some examples, aspects of the operations of 1815 may be performed by an indicator component as described with reference to FIGS. 11-14.

Figure 19:
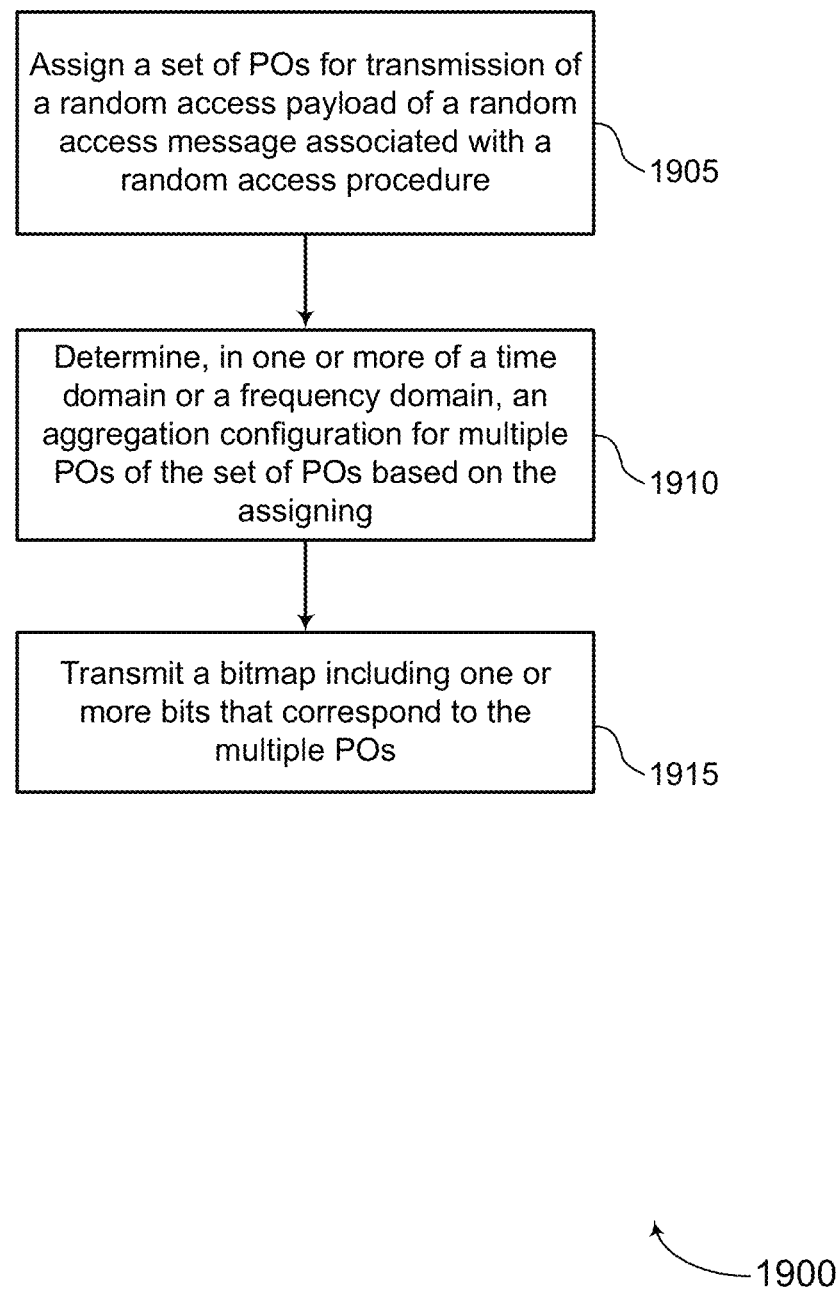

FIG. 19 shows a flowchart illustrating a method 1900 that supports PO aggregation in accordance with aspects of the present disclosure. The operations of method 1900 may be implemented by a base station 105 or its components as described herein. For example, the operations of method 1900 may be performed by a communications manager as described with reference to FIGS. 11-14. In some examples, a base station may execute a set of instructions to control the functional elements of the base station to perform the functions described herein. Additionally or alternatively, a base station may perform aspects of the functions described herein using special-purpose hardware.

At 1905, the base station may assign a set of POs for transmission of a random access payload of a random access message associated with a random access procedure. The operations of 1905 may be performed according to the methods described herein. In some examples, aspects of the operations of 1905 may be performed by an allocation component as described with reference to FIGS. 11-14.

At 1910, the base station may determine, in one or more of a time domain or a frequency domain, an aggregation configuration for multiple POs of the set of POs based on the assigning. The operations of 1910 may be performed according to the methods described herein. In some examples, aspects of the operations of 1910 may be performed by an aggregation component as described with reference to FIGS. 11-14.

At 1915, the base station may transmit a bitmap including one or more bits that correspond to the multiple POs. In some examples, transmitting the indication of the aggregation configuration includes transmitting the bitmap. The operations of 1915 may be performed according to the methods described herein. In some examples, aspects of the operations of 1915 may be performed by an indicator component as described with reference to FIGS. 11-14.

Figure 20:
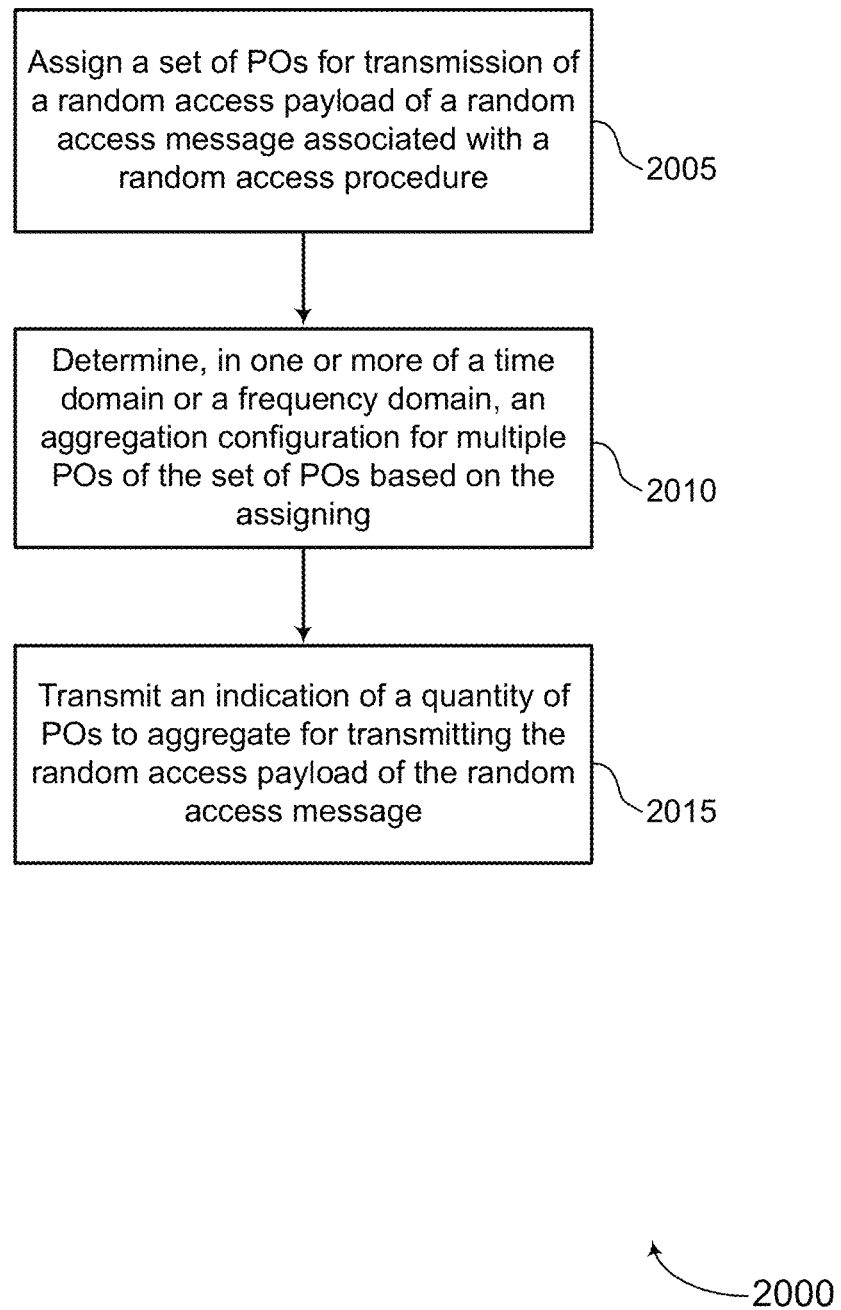

FIG. 20 shows a flowchart illustrating a method 2000 that supports PO aggregation in accordance with aspects of the present disclosure. The operations of method 2000 may be implemented by a base station 105 or its components as described herein. For example, the operations of method 2000 may be performed by a communications manager as described with reference to FIGS. 11-14. In some examples, a base station may execute a set of instructions to control the functional elements of the base station to perform the functions described herein. Additionally or alternatively, a base station may perform aspects of the functions described herein using special-purpose hardware.

At 2005, the base station may assign a set of POs for transmission of a random access payload of a random access message associated with a random access procedure. The operations of 2005 may be performed according to the methods described herein. In some examples, aspects of the operations of 2005 may be performed by an allocation component as described with reference to FIGS. 11-14.

At 2010, the base station may determine, in one or more of a time domain or a frequency domain, an aggregation configuration for multiple POs of the set of POs based on the assigning. The operations of 2010 may be performed according to the methods described herein. In some examples, aspects of the operations of 2010 may be performed by an aggregation component as described with reference to FIGS. 11-14.

At 2015, the base station may transmit an indication of a quantity of POs to aggregate for transmitting the random access payload of the random access message. In some examples, transmitting the indication of the aggregation configuration includes transmitting the indication of the quantity of POs. The operations of 2015 may be performed according to the methods described herein. In some examples, aspects of the operations of 2015 may be performed by an indicator component as described with reference to FIGS. 11-14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), or others. CDMA2000 covers IS-2000, IS-95, and IS-856 standards. IS-2000 Releases may be commonly referred to as CDMA2000 1×, 1×, or others. IS-856 (TIA-856) is commonly referred to as CDMA2000 1×EV-DO, High Rate Packet Data (HRPD), or others. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, or others. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as several kilometers in radius) and may allow unrestricted access by UEs with service subscriptions with the network provider. A small cell may be associated with a lower-powered base station, as compared with a macro cell, and a small cell may operate in the same or different (such as licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (such as a home) and may provide restricted access by UEs having an association with the femto cell (such as UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (such as two, three, four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (such as a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (such as a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   receiving, from a base station, signaling comprising an indication of an aggregation configuration for physical uplink shared channel occasions;
   determining a random access message of a random access procedure, the random access message comprising a random access preamble and a random access payload;
   aggregating, in one or more of a time domain or a frequency domain, multiple physical uplink shared channel occasions of a set of physical uplink shared channel occasions based at least in part on the indication of the aggregation configuration, wherein aggregating the multiple physical uplink shared channel occasions of the set of physical uplink shared channel occasions comprises aggregating multiple physical uplink shared channel occasions that are contiguous in one or both of the time domain or the frequency domain; and
   transmitting, to the base station, the random access payload of the random access message on a physical uplink shared channel that comprises the aggregated multiple physical uplink shared channel occasions, each of the aggregated physical uplink shared channel occasions comprising time and frequency resources.

2. The method of claim 1, wherein aggregating the multiple physical uplink shared channel occasions of the set of physical uplink shared channel occasions comprises:
   aggregating a first subset of the multiple physical uplink shared channel occasions of the set of physical uplink shared channel occasions in the frequency domain; and
   aggregating a second subset of the multiple physical uplink shared channel occasions of the set of physical uplink shared channel occasions in the frequency domain.

3. The method of claim 1, wherein aggregating the multiple physical uplink shared channel occasions of the set of physical uplink shared channel occasions comprises aggregating two or more physical uplink shared channel occasions of the multiple physical uplink shared channel occasions of the set of physical uplink shared channel occasions in the time domain or the frequency domain.

4. The method of claim 1, wherein aggregating the multiple physical uplink shared channel occasions of the set of physical uplink shared channel occasions is based at least in part on a size of the random access payload.

5. The method of claim 1, wherein all each physical uplink shared channel occasions in the set of physical uplink shared channel occasions has a same size.

6. The method of claim 1, wherein receiving the indication of the aggregation configuration comprises:
receiving a bitmap comprising one or more bits each corresponding to a physical uplink shared channel occasion of the multiple physical uplink shared channel occasions,
wherein aggregating the multiple physical uplink shared channel occasions of the set of physical uplink shared channel occasions in one or both of the time domain or the frequency domain is further based at least in part on the bitmap.

7. The method of claim 1, wherein receiving the indication of the aggregation configuration comprises:
receiving an indication of a quantity of physical uplink shared channel occasions to aggregate for transmitting the random access payload of the random access message,
wherein aggregating the multiple physical uplink shared channel occasions of the set of physical uplink shared channel occasions in one or both of the time domain or the frequency domain is further based at least in part on the indication of the quantity of physical uplink shared channel occasions.

8. The method of claim 7, further comprising:
selecting the multiple physical uplink shared channel occasions within the set of physical uplink shared channel occasions to be aggregated based at least in part on the indication of the quantity and based at least in part on one or more criteria.

9. The method of claim 8, wherein the one or more criteria comprise one or more of a slot format, a duplex mode, a UE condition, or a physical uplink shared channel peak to average power ratio.

10. The method of claim 1, further comprising:
multiplexing the random access payload of the random access message on the time and frequency resources of the aggregated multiple physical uplink shared channel occasions,
wherein transmitting, to the base station, the random access payload of the random access message is further based at least in part on the multiplexing.

11. The method of claim 1, wherein transmitting the random access payload of the random access message on the physical uplink shared channel using the time and frequency resources of the aggregated multiple physical uplink shared channel occasions occurs on a same transmit beam.

12. The method of claim 11, wherein transmitting, to the base station, the random access payload of the random access message comprises transmitting, to the base station, the random access payload of the random access message on the physical uplink shared channel using the time and frequency resources of the aggregated multiple physical uplink shared channel occasions using a same transmit beam based at least in part on physical uplink shared channel occasions in the aggregated multiple physical uplink shared channel occasions having a same uplink spatial relation.

13. The method of claim 1, wherein transmitting the random access payload of the random access message on the physical uplink shared channel using the time and frequency resources of the aggregated multiple physical uplink shared channel occasions occurs on different transmit beams.

14. The method of claim 13, wherein transmitting, to the base station, the random access payload of the random access message comprises transmitting, to the base station, the random access payload of the random access message on the physical uplink shared channel using the time and frequency resources of the aggregated multiple physical uplink shared channel occasions using different transmit beams based at least in part on physical uplink shared channel occasions in the aggregated multiple physical uplink shared channel occasions having different uplink spatial relations.

15. The method of claim 1, further comprising:
receiving, from the base station, a reference signal; and
determining an uplink spatial relation of the physical uplink shared channel in the aggregated multiple physical uplink shared channel occasions based at least in part on receiving the reference signal,
wherein transmitting, to the base station, the random access payload of the random access message on the physical uplink shared channel is further based at least in part on the uplink spatial relation.

16. The method of claim 15, wherein the reference signal comprises one or more of a synchronization signal and physical broadcast channel block or a channel state information reference signal.

17. The method of claim 1, wherein receiving the signaling further comprises:
receiving, from the base station, an indication comprising an uplink spatial relation of the physical uplink shared channel in the aggregated multiple physical uplink shared channel occasions,
wherein transmitting, to the base station, the random access payload of the random access message on the physical uplink shared channel is further based at least in part on the uplink spatial relation.

18. A method for wireless communication at a base station, comprising:
assigning a set of physical uplink shared channel occasions for transmission of a random access payload of a random access message associated with a random access procedure;
determining a slot format associated with multiple physical uplink shared channel occasions of the set of physical uplink shared channel occasions;
determining, in one or more of a time domain or a frequency domain, an aggregation configuration for the multiple physical uplink shared channel occasions of the set of physical uplink shared channel occasions based at least in part on the assigning and further based at least in part on the slot format; and
transmitting, to a user equipment, signaling comprising an indication of the aggregation configuration for physical uplink shared channel occasions.

19. The method of claim 18, wherein transmitting the indication of the aggregation configuration comprises:
transmitting a bitmap comprising one or more bits that correspond to the multiple physical uplink shared channel occasions; or
transmitting an indication of a quantity of physical uplink shared channel occasions to aggregate for transmitting the random access payload of the random access message.

20. The method of claim 18, further comprising:
determining a duplex mode associated with the multiple physical uplink shared channel occasions of the set of physical uplink shared channel occasions,
wherein determining the aggregation configuration for the multiple physical uplink shared channel occasions of the set of physical uplink shared channel occasions is further based at least in part on the duplex mode.

21. The method of claim 18, further comprising:
determining a UE condition associated with the multiple physical uplink shared channel occasions of the set of physical uplink shared channel occasions,
wherein determining the aggregation configuration for the multiple physical uplink shared channel occasions of the set of physical uplink shared channel occasions is further based at least in part on the UE condition, wherein the UE condition is based at least in part on a UE location within a cell.

22. The method of claim 18, further comprising:
determining a physical uplink shared channel peak to average power ratio associated with the multiple physical uplink shared channel occasions of the set of physical uplink shared channel occasions,
wherein determining the aggregation configuration for the multiple physical uplink shared channel occasions of the set of physical uplink shared channel occasions is further based at least in part on the physical uplink shared channel peak to average power ratio.

23. The method of claim 18, further comprising:
receiving, from the user equipment, the random access payload of the random access message carried on a physical uplink shared channel and on time and frequency resources of aggregated multiple physical uplink shared channel occasions,
wherein the physical uplink shared channel in the aggregated multiple physical uplink shared channel occasions have a same uplink spatial relation.

24. The method of claim 18, further comprising:
receiving, from the user equipment, the random access payload of the random access message carried on a physical uplink shared channel and on time and frequency resources of aggregated multiple physical uplink shared channel occasions,
wherein the physical uplink shared channel in the aggregated multiple physical uplink shared channel occasions have different uplink spatial relations.

25. The method of claim 18, further comprising transmitting, to the user equipment, an indication comprising an uplink spatial relation of a physical uplink shared channel in the multiple physical uplink shared channel occasions of the set of physical uplink shared channel occasions.

26. An apparatus for wireless communication, comprising:
a processor,
memory in electronic communication with the processor; and
instructions stored in the memory and executable by the processor to cause the apparatus to:
receive, from a base station, signaling comprising an indication of an aggregation configuration for physical uplink shared channel occasions;
determine a random access message of a random access procedure, the random access message comprising a random access preamble and a random access payload;
aggregate, in one or more of a time domain or a frequency domain, multiple physical uplink shared channel occasions of a set of physical uplink shared channel occasions based at least in part on the aggregation configuration, wherein aggregating the multiple physical uplink shared channel occasions of the set of physical uplink shared channel occasions comprises aggregating multiple physical uplink shared channel occasions that are contiguous in one or both of the time domain or the frequency domain; and
transmit, to the base station, the random access payload of the random access message on a physical uplink shared channel that includes the aggregated multiple physical uplink shared channel occasions, each of the aggregated physical uplink shared channel occasions including time and frequency resources.

27. The apparatus of claim 26, wherein instructions for aggregating the multiple physical uplink shared channel occasions of the set of physical uplink shared channel occasions are further executable by the processor to cause the apparatus to:
aggregate a first subset of the multiple physical uplink shared channel occasions of the set of physical uplink shared channel occasions in the frequency domain; and
aggregate a second subset of the multiple physical uplink shared channel occasions of the set of physical uplink shared channel occasions in the frequency domain.

28. The method of claim 26, wherein aggregating the multiple physical uplink shared channel occasions of the set of physical uplink shared channel occasions comprises aggregating two or more physical uplink shared channel occasions of the multiple physical uplink shared channel occasions of the set of physical uplink shared channel occasions in the time domain or the frequency domain.

29. An apparatus for wireless communication, comprising:
a processor,
memory in electronic communication with the processor; and
instructions stored in the memory and executable by the processor to cause the apparatus to:
assign a set of physical uplink shared channel occasions for transmission of a random access payload of a random access message associated with a random access procedure;
determine a slot format associated with multiple physical uplink shared channel occasions of the set of physical uplink shared channel occasions;
determine, in one or more of a time domain or a frequency domain, an aggregation configuration for the multiple physical uplink shared channel occasions of the set of physical uplink shared channel occasions based at least in part on the assigning and further based at least in part on the slot format; and
transmit, to a user equipment, signaling comprising an indication of the aggregation configuration for physical uplink shared channel occasions.

30. The apparatus of claim 29, wherein the instructions for transmitting the indication of the aggregation configuration further comprise instructions executable by the processor to cause the apparatus to:
transmit a bitmap comprising one or more bits that correspond to the multiple physical uplink shared channel occasions; or
transmit an indication of a quantity of physical uplink shared channel occasions to aggregate for transmitting the random access payload of the random access message.

* * * * *